(12) United States Patent
Li et al.

(10) Patent No.: US 12,207,332 B2
(45) Date of Patent: Jan. 21, 2025

(54) COORDINATED TRANSMISSION AND CONTROL FOR AUDIO OUTPUT DEVICES

(71) Applicant: Apple Inc., Cupertino, CA (US)

(72) Inventors: Lei Li, Santa Clara, CA (US); Xiaojun Chen, San Jose, CA (US); Camille Chen, Cupertino, CA (US); Siegfried Lehmann, Sunnyvale, CA (US); Vusthla Sunil Reddy, Cupertino, CA (US); Peter M Agboh, Bend, OR (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/453,597

(22) Filed: Aug. 22, 2023

(65) Prior Publication Data

US 2023/0397280 A1 Dec. 7, 2023

Related U.S. Application Data

(63) Continuation of application No. 17/652,792, filed on Feb. 28, 2022, now Pat. No. 11,743,963, which is a continuation of application No. 16/585,534, filed on Sep. 27, 2019, now Pat. No. 11,297,670.

(60) Provisional application No. 62/737,252, filed on Sep. 27, 2018.

(51) Int. Cl.
*H04W 76/16* (2018.01)
*H04B 17/318* (2015.01)
(Continued)

(52) U.S. Cl.
CPC .......... *H04W 76/16* (2018.02); *H04B 17/318* (2015.01); *H04L 5/0055* (2013.01);
(Continued)

(58) Field of Classification Search
CPC .... H04B 17/24; H04B 17/318; H04B 17/382; H04L 5/0055; H04L 63/1475; H04W 4/80; H04W 12/00305; H04W 12/50; H04W 12/55; H04W 12/65; H04W 12/122; H04W 52/143; H04W 52/245; H04W 52/247;
(Continued)

(56) References Cited

U.S. PATENT DOCUMENTS 10,200,791 B1 * 2/2019 Liu ........................ H04R 5/033
10,412,481 B1 * 9/2019 Wu ........................ H04R 5/033
(Continued)

FOREIGN PATENT DOCUMENTS

CN 113661777 A * 11/2021 ........... H04L 1/0061
CN 116114275 A * 5/2023 ........... H04L 1/0033
(Continued)

*Primary Examiner* — Eric Nowlin
(74) *Attorney, Agent, or Firm* — Fay Kaplun & Marcin, LLP

(57) ABSTRACT

Methods performed by a first sink device, a source device, or a second sink device. The first sink device is connected to a source device via a first communication link and a second sink device via a second communication link, wherein the second sink device is configured to eavesdrop on communications between the first sink device and the source device on the first communication link. The methods include determining an occurrence of a trigger event and modifying an operation of at least one of the first sink device, the second sink device or the source device based at least on the trigger event occurring.

20 Claims, 7 Drawing Sheets

(51) Int. Cl.
*H04L 5/00* (2006.01)
*H04W 4/80* (2018.01)
*H04W 12/55* (2021.01)
*H04W 52/50* (2009.01)
*H04W 84/18* (2009.01)

(52) U.S. Cl.
CPC ............ *H04W 4/80* (2018.02); *H04W 12/55* (2021.01); *H04W 52/50* (2013.01); *H04W 84/18* (2013.01)

(58) Field of Classification Search
CPC ... H04W 52/383; H04W 52/40; H04W 52/50; H04W 76/14; H04W 76/15; H04W 76/16; H04W 84/18
See application file for complete search history.

(56) References Cited

U.S. PATENT DOCUMENTS

| | | | | |
|---|---|---|---|---|
| 10,412,494 | B2 * | 9/2019 | Tong | ............... H04R 5/033 |
| 10,819,489 | B2 * | 10/2020 | Agarwal | ............... H04L 1/0007 |
| 10,990,349 | B2 * | 4/2021 | Kumar | ............... H04L 1/189 |
| 11,297,670 | B2 * | 4/2022 | Li | ............... H04W 52/40 |
| 11,375,574 | B2 * | 6/2022 | Srivastava | ............ H04W 76/40 |
| 11,451,906 | B2 * | 9/2022 | Tong | ............... H04R 5/033 |
| 11,743,963 | B2 * | 8/2023 | Li | ............... H04W 12/122 |
| | | | | 370/409 |
| 2018/0184234 | A1 * | 6/2018 | Chen | ............... H04W 76/14 |
| 2019/0102143 | A1 * | 4/2019 | Kumar | ............... H04L 1/0007 |
| 2019/0141502 | A1 * | 5/2019 | Sung | ............... H04W 4/80 |
| 2019/0174232 | A1 * | 6/2019 | Tong | ............... H04W 4/80 |
| 2019/0387319 | A1 * | 12/2019 | Tong | ............... H04W 4/80 |
| 2020/0137544 | A1 * | 4/2020 | Sung | ............... H04R 5/033 |
| 2020/0177348 | A1 * | 6/2020 | Agarwal | ............... H04L 1/1854 |
| 2022/0015169 | A1 * | 1/2022 | Xu | ............... H04W 76/14 |
| 2022/0053599 | A1 * | 2/2022 | Srivastava | ............ H04L 65/1069 |
| 2022/0159782 | A1 * | 5/2022 | Ouyang | ............... H04W 84/20 |
| 2022/0183097 | A1 * | 6/2022 | Li | ............... H04W 4/80 |
| 2023/0397280 | A1 * | 12/2023 | Li | ............... H04W 52/245 |
| 2024/0063981 | A1 * | 2/2024 | Liu | ............... H04R 1/1041 |

FOREIGN PATENT DOCUMENTS

| | | | | |
|---|---|---|---|---|
| JP | 7357072 | B2 * | 10/2023 | ............ H04L 1/0061 |
| JP | 2023139084 | A * | 10/2023 | ............ H04L 1/0061 |
| WO | WO-2022035563 | A1 * | 2/2022 | ............ H04L 1/0033 |
| WO | WO-2024039545 | A1 * | 2/2024 | ............ H04L 5/0055 |
| WO | WO-2024040159 | A1 * | 2/2024 | |

* cited by examiner

COORDINATED TRANSMISSION AND CONTROL FOR AUDIO OUTPUT DEVICES

PRIORITY INFORMATION/INCORPORATION BY REFERENCE

This application claims priority to U.S. Provisional Application 62/737,252 entitled "Coordinated Transmission and Control for Audio Output Devices," filed on Sep. 27, 2018, the entirety of which is incorporated herein by reference.

BACKGROUND INFORMATION

A short-range wireless communication protocol enables communications to be exchanged wirelessly between two or more devices. For example, the first device may be a source device providing audio data to the second device. The second device may be a sink device that receives the audio data and generates an audio output. The second device may be a single, integrated device such as headphones or an earpiece. Headphones may include two audio components that have a wired connection. An earpiece may include one audio output component. However, in each case, for the short-range transmission, the second device utilize a single communication link between the source device and the sink device.

The second device may also be a paired device including a first sink device and a second sink device. In such an implementation, the second device may utilize a first communication link between the source device and the first sink device (e.g., which acts as a primary sink device). The first communication link may be established directly such that both the source device and the first sink device acknowledge one another in this link. The second device, which acts as a secondary sink device, eavesdrops on the first communication link to receive any communications being transmitted over the first communication link. Thus, the source device and the second device have an indirect relationship such that the second sink device recognizes transmissions over the first communication link, but the source device may be unaware of the second sink device.

When the second device is a paired device or multiple devices including a first sink device and at least one second sink device, scenarios may arise when either the first sink device or the second sink device do not receive the communication. Thus, only one device is capable of outputting the corresponding audio while the other sink device remains silent. This results in a poor user experience when at least one of the sink devices is unable to produce the proper output.

SUMMARY

In an exemplary embodiment, a method is performed by a first sink device connected to a source device via a first communication link and a second sink device via a second communication link, wherein the second sink device is configured to eavesdrop on communications between the first sink device and the source device on the first communication link. The method includes determining an occurrence of a trigger event and modifying an operation of the first sink device based at least on the trigger event occurring.

In a further exemplary embodiment, a method is performed by a source device configured to transmit a packet via a first communication link to a primary sink device, wherein a secondary sink device is configured to receive the packet by eavesdropping on the first communication link. The method includes receiving first link statistics associated with the first communication link between the primary sink device and the source device and second link statistics associated with an eavesdrop communication link between the secondary sink device and the source device and determining a setting to be used in transmitting a further packet via the first communication link to the primary sink device.

In a still further exemplary embodiment, a source device having a transceiver and a processor is described. The transceiver is configured to establish a first communication link with a primary sink device and transmit a packet, in accordance with one or more settings, to the primary sink device via the first communication link, wherein a secondary sink device is configured to receive the packet by eavesdropping on the first communication link. The processor is configured to determine first link statistics associated with the first communication link between the primary sink device and the source device and second link statistics associated with an eavesdrop communication link between the secondary sink device and the source device. The processor is further configured to determine the settings to be used in transmitting the packet to the primary sink device via the first communication link.

DETAILED DESCRIPTION

Figure 1:
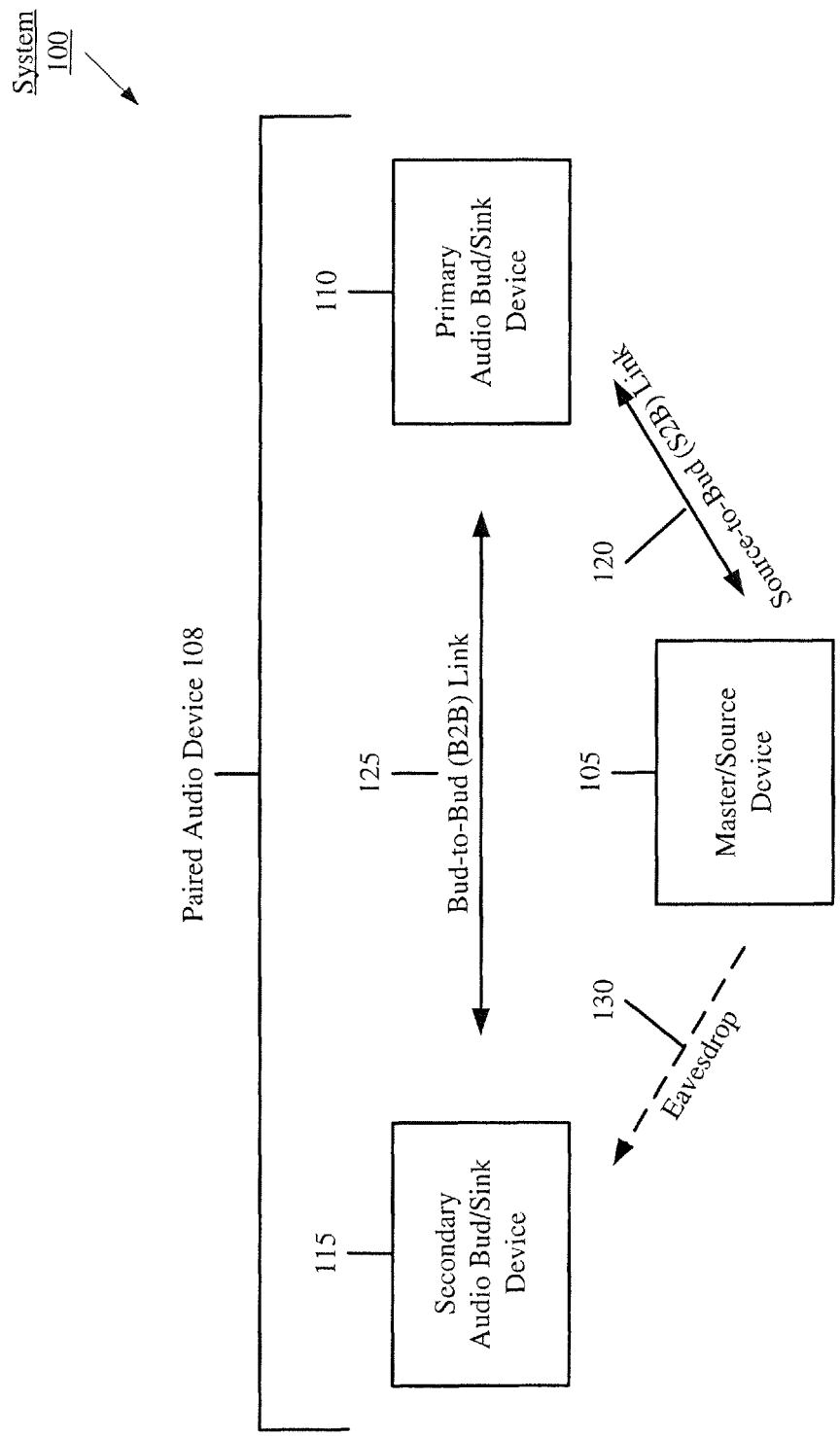
FIG. 1 shows an exemplary system of components utilizing short-range communication links according to various exemplary embodiments described herein.

The exemplary embodiments may be further understood with reference to the following description and the appended drawings, wherein like elements are referred to with the same reference numerals. The exemplary embodiments describe devices, systems, and methods to coordinate short-range transmissions from a first device to a wirelessly paired second device using a wireless communication link. The exemplary embodiments include a plurality of mechanisms that improve the manner in which the short-range transmissions are transmitted by a source device and received by a plurality of sink devices to increase the probability that all of the sink devices receive the short-range transmissions. A first mechanism may involve operations performed by the sink devices that are transparent to the source device. A second mechanism may involve operations performed by the sink devices to provide information to the source device to modify transmission settings. A third mechanism may involve operations performed by the source device to ascertain information that modifies transmission settings.

Initially, the exemplary embodiments are described with regard to a Bluetooth connection. However, the use of the Bluetooth connection and corresponding operations associated with the Bluetooth connection is only exemplary. The exemplary embodiments may be modified to be used with any type of wireless connection, particularly a peer-to-peer connection, and corresponding operations associated with the wireless connection. For example, the exemplary embodiments may also be used when the connection is a WiFi Direct connection.

The exemplary embodiments are also described with regard to an electronic device such as a user equipment performing operations corresponding to a source device and/or a sink device. However, the electronic devices as described herein are only exemplary. The exemplary embodiments may be utilized with any device that may establish a short-range connection (e.g., Bluetooth connection). The arrangement including a source device and sink device is also only exemplary. The exemplary embodiments may relate to any two devices that establish the Bluetooth connection in which data is exchanged. In addition, the use of the terms source and sink to signify a master and subordinate relationship is only exemplary. For example, the connected devices may each operate as a source and a sink over the same connection at different times, examples of which are provided below.

The exemplary embodiments are further described with regard to the source device being a device such as a smartphone or a tablet computer and the sink devices being audio buds where the source device transmits audio packets to the sink device. However, the exemplary source and sink devices should only be considered examples and some other examples of source and sink devices will be provided below. Also, the use of audio packets is only exemplary. The exemplary embodiments may be implemented for any type of electronic devices that transmit and/or receive any type of data. For example, when the sink devices are video output devices that display the same video, the data may be video data and/or multimedia data.

As described above, a direct communication link may be established between the source device (e.g., smartphone) and a primary sink device (e.g., first wireless audio earbud) and an indirect communication link may exist for the source device and a secondary sink device (e.g., second wireless audio earbud). However, further communications links may also be established between the multiple sink devices. For example, the primary sink device and the secondary sink device may form a communication link to exchange data. In this communication link, it may be considered that the primary sink device is also a source device and the secondary sink device is the sink device for this further connection. In another example, one of the wireless audio earbuds may also include a microphone that receives audio input from a user (e.g., when the user is on a voice call). In this scenario, the wireless audio earbud may be transmitting audio packets to the smartphone. Thus, in this example, the wireless audio earbud may be considered the source device and the smartphone may be considered the sink device. In a still further example, one of the devices may be a hearing aid that transmits the audio that it receives to the smartphone (e.g., for further processing of the audio signal, transcription, recording, etc.). Again, in this example, the hearing aid may be considered the source device transmitting the audio signal to the smartphone that is the sink device. As these examples illustrate, devices may act as both a source and a sink (sometimes simultaneously) depending on the various communication links that have been established by the device.

The exemplary embodiments relate to configurations where a source device transmits short-range communications or packets to a plurality of sink devices over a Bluetooth connection. For all of the sink devices to receive the packet, a valid and usable communication pathway from the source device to each of the sink devices must exist. Although there are various settings and configurations that are utilized to improve the manner of the sink devices receiving the packet, there may also be other considerations that prevent consistent use of these settings and configurations. For example, a higher transmit power may provide a greater transmission range to allow sink devices positioned at a greater distance from the source device to receive the packet. However, use of the higher transmit power consumes a greater amount of battery power. There is a tradeoff in using select settings to control transmission operations.

There are also a variety of scenarios and underlying reasons that may prevent one or more of the sink devices from receiving the packet. In a first example, there may be a significant delta in received signal strength indicator (RSSI) values when the sink devices are positioned in a cross-body position (e.g., a first sink device in one ear, a second sink device in another ear). For example, the RSSI delta may be approximately 15 dB. The RSSI delta may not be accurately accounted for in settings used by the source device (e.g., transmit power), particularly when the source device uses information associated with the sink device having the best reception.

In a second example, an instantaneous RSSI delta between sink devices may be significant (e.g., relative to an average RSSI delta). For example, an instantaneous RSSI delta may be up to 40 dB. The increase in the RSSI delta may be due to various reasons such as fading. When the source device uses information that corresponds to the instantaneous RSSI delta (as opposed to an average or lesser RSSI delta), the source device may utilize settings that do not properly account for a true RSSI delta.

In a third example, among the sink devices, a first sink device may include a user input component. The input may be a gesture control that is directly entered on the user input component or registered using a sensor (e.g., finger-squeeze, hand covering, waving, etc.). The user's actions may have a significant impact on antenna performance on the sink device. For example, in view of the small form factor associated with certain sink devices, the impact may cause a degraded wireless link that results in audio glitches, unresponsive user interface control issues, etc. In a particular example, the sink device may experience a first average RSSI value. However, during a gesture period, the sink device may experience a second, lower average RSSI value. After the gesture period, the sink device may again experience the first average RSSI value. Therefore, during the gesture period, there may be an increase in likelihood that an audio error occurs and a rate at which audio errors occur may also increase.

In a fourth example, among the sink devices, a first sink device may be a primary sink device while all remaining sink devices may be considered secondary sink devices. As described above, a direct communication link may only be established between the source device and the primary sink device while secondary sink devices eavesdrop this communication link. In this scenario, the source device may only be aware of the presence of the primary sink device. If the source device has a strong communication link with the primary sink device (e.g., based on a RSSI value), the source device may not utilize a high or maximum transmit power. At the same time, one or more secondary sink devices may have a weak link to eavesdrop the communication link. There may be various reasons for the secondary sink device to exhibit the weaker link (e.g., cross-body attenuation, gesture control covering the secondary sink device, etc.). Therefore, the primary sink device having a strong communication link may result in use of a lower transmit power, but this may result in the secondary sink device having continuous poor packet reception leading to audio glitches. In this example, the RSSI delta is not accurately accounted for in the transmit power control of the source device.

In a fifth example, there may be an opposite configuration from the fourth example where the source device has a weak communication link with the primary sink device while the secondary source device may have a strong link to eavesdrop the communication link. In such a scenario, the source device may constantly use a high transmit power to cover the relatively poor communication link with the primary source device at the cost of reduced battery life of the source device.

In a sixth example, the source device may be configured with antenna diversity, transmit diversity, beam forming, coexistence schemes, specific absorption rate (SAR) schemes, etc. to transmit packets to the primary sink device. The diversity scheme may continuously select an antenna, transmit settings or a beam former that works well with the primary sink device. However, with the source device being unaware of the existence of the secondary sink devices, the diversity scheme may not work well with the secondary sink devices. For example, in a cross body scenario, a first source device antenna may be selected and work well with the primary sink device that is on the same side of the body as the source device, but that first antenna may not provide a good signal for the secondary sink device that is on the other side of the body. Similarly, the source device may select a first beam former that works well with the primary sink device, but not the secondary sink device. These examples also show that these types of transmission settings may allow the primary sink device to properly receive the transmissions and output the audio, while audio glitches may occur on the secondary sink devices.

The above examples describe general problems that may occur when transmitting packets from a source device to a plurality of sink devices. The source device may be considered the master for the overall transmit quality control. For example, the source device selects the transmission settings for transmitting packets to the primary sink device. These settings may also control the manner by which the secondary sink devices receive packets. For example, transmission settings may include transmit power, retransmission policies, adaptive frequency hopping schemes, audio packet scheduling, antenna switch controls, beam forming, etc. However, as described above, there are scenarios that result in sub-optimal conditions for the source device and/or the sink devices including audio glitches and increased power consumption.

The exemplary embodiments provide a plurality of mechanisms that may be implemented to transmit a packet from the source device to the sink devices. In utilizing the mechanisms according to the exemplary embodiments, the source device may select appropriate settings to balance transmission quality and other factors such as power consumption. The sink devices may also provide features to increase the probability that all sink devices properly receive the packet.

FIG. 1 shows a system 100 of components utilizing short-range communication links according to the exemplary embodiments. The system 100 illustrates a possible network of short-range connections between a master or source device 105 and an accessory device illustrated as a paired audio device 108 including a primary audio bud or sink device 110 and a secondary audio bud or sink device 115. The system 100 shows when the short-range connections have been established between the source device 105 and accessory devices (e.g., the paired audio device 108). For illustrative purposes, the master device or source device may be used interchangeably to represent the device 105; the primary audio bud or the primary sink device may be used interchangeably to represent the device 110; and the secondary audio bud or the secondary sink device may be used interchangeably to represent the device 115. The use of a paired accessory device is only exemplary, and the exemplary embodiments may be implemented or modified to be used with multiple sink devices including more than two sink devices.

A source-to-audio bud (S2B) link 120 is a short-range communication link that may be established between the source device 105 and the primary audio bud 110. An audio bud-to-audio bud (B2B) link 125 is a short-range communication link that may be established may be between the primary audio bud 110 and the secondary audio bud 115. The secondary audio bud 115 may also be configured to perform an eavesdrop 130 (or snoop) on data being exchanged on the S2B link 120 or being broadcast/transmitted by the source device 105. The system 100 may also include further short-range communication links such as between the source device 105 and the secondary audio bud 115 (not shown). In one example, the short-range communication links may be Bluetooth connections.

The exemplary embodiments refer to the eavesdrop 130 as a communication pathway, a connection, a link, etc. However, the eavesdrop 130 is an operation performed by the secondary audio bud 115 to monitor the S2B link 120 and transmissions exchanged over the S2B link 120. This monitoring associated with the eavesdrop 130 may result in statistics being generated for the "link" used by the secondary audio bud 115. Therefore, the exemplary embodiments refer to link statistics for the eavesdrop 130. However, those skilled in the art will appreciate that the eavesdrop may not be a link, connection, communication pathway, etc. as used in a conventional understanding. For example, an explicit connection (e.g., a piconet) may not be formed between the source device 105 and the secondary audio bud 115. In another example, in a connection, the end devices of the connection typically acknowledge one another. However, using the eavesdrop 130, the source device 105 may be unaware of the existence of the secondary audio bud 115. Thus, the eavesdrop 130 being referred to as a link is for illustrative purposes due to the link statistics that may be generated based on the eavesdrop functionality. In addition, the eavesdrop 130 is generally enabled because the secondary audio bud 115 is aware of the transmission schedule for the S2B link 120 between the source device 105 and the primary audio bud 110. This awareness may be based on communications between the primary audio bud 110 and the secondary audio bud via the B2B link 125.

The source device 105 may be any electronic device capable of establishing the S2B link 120. For example, the source device 105 may be a mobile device (e.g., a mobile computing device, a mobile phone, a personal computer, a cellular phone, a smartphone, a tablet computer, a phablet, a laptop, a VoIP phone, a personal digital assistant, an embedded device, a wearable device, a Cat-M device, a Cat-M1 device, a MTC device, an eMTC device, a peripheral device, another type of an Internet of Things (IoT) device, etc.) or a stationary device (e.g., a desktop terminal). The paired audio device 108 including the primary audio bud 110 and the secondary audio bud 115 may be any plurality of wireless audio output components used together (e.g., ear buds). The primary audio bud 110 and the secondary audio bud 115 may be untethered to the source device 105 as well as to each other. The use of audio related devices such as the audio buds is only exemplary. For example, the primary audio bud 110 and the secondary audio bud 115 may also be another smartphone, a wireless earpiece, a wireless headset, a wireless display device, a wearable, Bluetooth-enabled hands-free headsets, wireless speakers, intercoms, fitness tracking devices, sensors, automobile sound systems, etc.

In the system 100, the source device 105 and the primary audio bud 110 may have a master/subordinate relationship over the S2B link 120. Similarly, the primary audio bud 110 and the secondary audio bud 115 may have a master/subordinate (or primary/secondary) relationship over the B2B link 125. However, the master/subordinate relationship is only exemplary. According to another exemplary embodiment, the components connected via the short-range communication links may have a mutual relationship where neither component has a priority (e.g., sharing an equal priority) or neither component has predetermined operations that must be performed (e.g., the predetermined operations may have shared or the duty to perform may be shared). In yet another exemplary embodiment, the master/subordinate relationship may be dynamically set. As will be described further below, according to a sink coordination scheme, the primary audio bud 110 and the secondary audio bud 115 may coordinate to set the appropriate setting based on current conditions. Thereafter, the selected primary audio bud 110 may establish the S2B link 120 with the source device 105.

Figure 2:
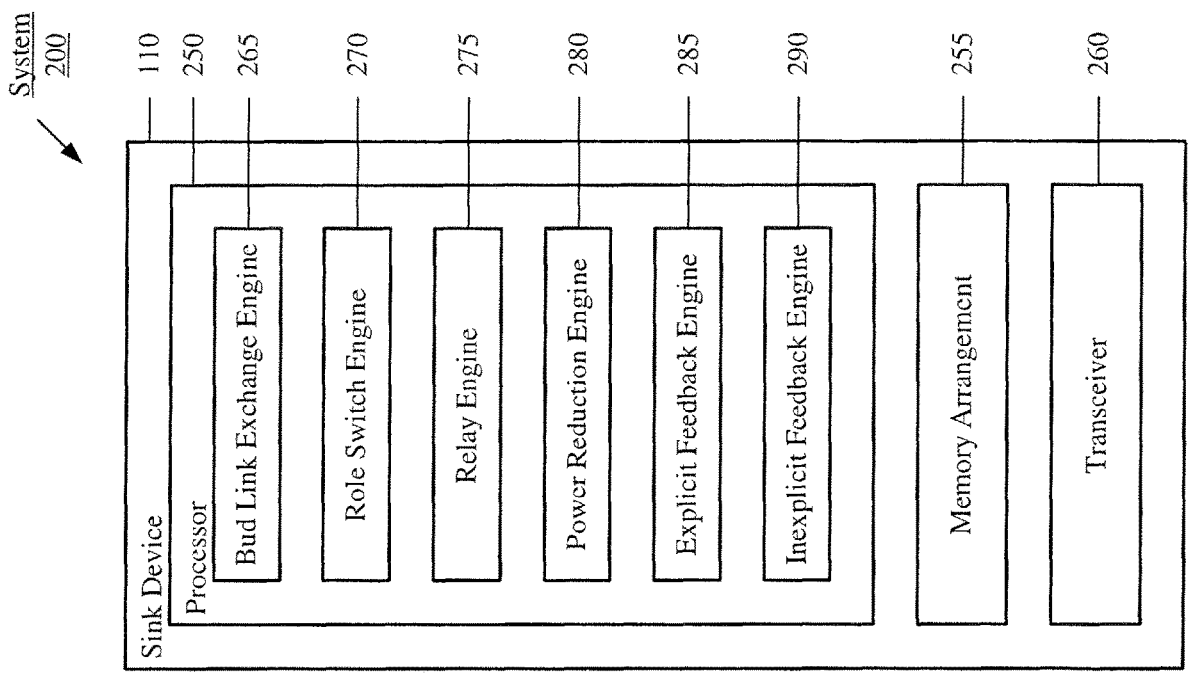
FIG. 2 shows select components of the exemplary system of FIG. 1 according to various exemplary embodiments described herein.
Figure 2:
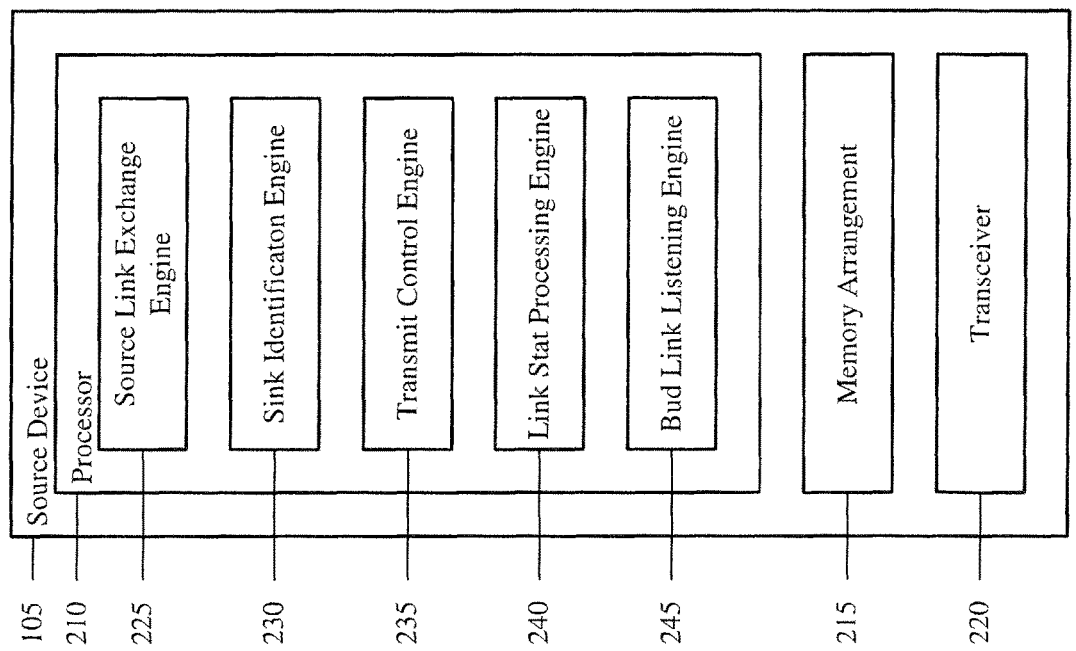

In establishing the short-range communications links (e.g., the S2B link 120 or the B2B link 125), the source device 105, the primary audio bud 110, and the secondary audio bud 115 may include the necessary hardware, software, and/or firmware to perform conventional operations as well as operations according to the exemplary embodiments. FIG. 2 shows select components of the exemplary system 100 of FIG. 1 according to various exemplary embodiments described herein. FIG. 2 shows the system 100 including the source device 105 and the primary sink device 110. The description herein for the primary sink device 110 may also be used to describe the secondary sink device 115 as the secondary sink device 115 may include substantially similar components and functionalities as the primary sink device 110.

The source device 105 and the primary sink device 110 may be used to exchange data (e.g., audio streaming) over the S2B link 120. The source device 105 and the primary sink device 110 may include components that enable this data exchange to be performed in a manner consistent with the mechanisms according to the exemplary embodiments. As shown in FIG. 2, the source device 105 may include a processor 210, a memory arrangement 215, and a transceiver 220. The source device 105 may also include further components such as a display device, an input/output (I/O) device, and other components such as a portable power supply, an audio I/O device, etc. The primary sink device 110 may also include substantially similar components such as a processor 250, a memory arrangement 255, and a transceiver 260 as well as other components.

The processors 210, 250 may be configured to execute a plurality of engines of the source device 105 and the primary sink device 110, respectively. For example, the engines executed by the processor 210 may include a source link exchange engine 225, a sink identification engine 230, a transmit control engine 235, a link stat processing engine 240, and a bud link listening engine 245. Each of these engines 225-245 will be described in more detail below.

In another example, the engines executed by the processor 250 may include a bud link exchange engine 265, a role switch engine 270, a relay engine 275, a power reduction engine 280, an explicit feedback engine 285, and an inexplicit feedback engine 290. Each of these engines 265-290 will be described in more detail below.

The above described engines each being an application (e.g., a program) executed by the processors 210, 250 is only exemplary. The functionality associated with the engines may also be represented as a separate incorporated component of the source device 105 or the primary sink device 110 or may be a modular component coupled to the source device 105 or the primary sink device 110, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. In addition, in some devices, the functionality described for the processors 210, 250 may be split among two or more processors such as a baseband processor and an applications processor. The exemplary embodiments may be implemented in any of these or other configurations of a device.

The memory arrangements 215, 255 may be a hardware component configured to store data related to operations performed by the source device 105 and the primary sink device 110, respectively. For example, the memory arrangement 215 may store information link statistics associated with the primary sink device 110 and/or the secondary sink device 115. In another example, the memory arrangement 255 may store the packet transmitted from the source device 105 as well as link statistics associated with the primary sink device 110 and/or the secondary sink device 115. The transceivers 220, 260 may be a component of the source device 105 and the sink device 110, respectively, that enables communication with other devices over one or more communication pathways. For example, the transceivers 220, 260 may enable the Bluetooth connection between the source device 105 and the primary sink device 110. The transceivers 220, 260 may therefore be equipped with a Bluetooth radio. The transceiver 260 may also enable the Bluetooth connection between the primary sink device 110 and the secondary sink device 115.

Source Device Engines

The following provides a short description of the engines executed by the source device 105 according to the exemplary embodiments. The source link exchange engine 225 may select settings and transmit a packet from the source device 105 to the primary sink device 110 over the S2B link 120. Those skilled in the art will understand the various manners that may be used to transmit a packet over the S2B link 120. The source link exchange engine 225 may receive data from an application executing on the source device 105 (e.g., an audio streaming application), generate a corresponding packet or plurality of packets, identify transmission settings, and transmit the packet over the S2B link 120 using the settings.

The sink identification engine 230 may identify the sink device in the paired audio device 108 with which the source device 105 has established a connection over the S2B link 120. When the paired audio device 108 includes a plurality of sink devices and when these sink devices are configured such that any one may act as the primary sink device 110 while the remaining ones act as the secondary sink device 115, the S2B link 120 may be established between the source device 105 and different ones of the sink devices. The sink identification engine 230 may determine which of the sink devices is the primary sink device 110. The sink identification engine 230 may also determine information associated with the S2B link 120 (e.g., link statistics) with the identified primary sink device 110.

The transmit control engine 235 may determine transmit settings to be used in transmitting a packet to the primary sink device 110. In a first example, the transmission setting may be the transmit power. A relatively high transmit power results in a first transmission range while a relatively low transmit power results in a second, smaller transmission range in which the packet may be transmitted. The high transmit power may be selected when a quality of a communication link is relatively weak while a lower transmit power may be selected when a quality of a communication link is relatively strong. The quality of the communication link may be being determined, for example, based on the information determined by the sink identification engine 230. The transmit control engine 235 may determine the appropriate transmit power and provide this information to the source link exchange engine 225 for a packet to be transmitted.

In a second example, the transmission setting may be an antenna switch scheme for a single chain radio source device with multiple antennas. In this example, the source device 105 may select different antennas to transmit to individual sink devices at different transmit opportunities. As will be described in greater detail below, the source device 105 may receive explicit or inexplicit feedback from one or more of the sink devices. Based on this feedback, the source device 105 may select different antennas for different transmit opportunities based on the transmit control engine 235 determining the appropriate transmission antenna and providing this information to the source link exchange engine 225 for a packet to be transmitted.

In a third example, the transmission setting may be a transmit beam forming scheme for a multi-chain radio/antenna source device. In this example, the source device 105 may beam form to individual sink devices at the one or different transmit opportunities. Again, one or more of the feedback mechanisms described below may be used as input for the beam forming transmission setting. Thus, the transmit control engine 235 may determine the appropriate beam former and provide this information to the source link exchange engine 225 for a packet to be transmitted.

In a fourth example, the transmission setting may be a MIMO scheme for a multi-chain radio/antenna source device. For example, the source device 105 may transmit independent spatial streams, e.g., a first antenna/radio chain of the source device transmits left channel audio information to a first sink device and a second antenna/radio chain of the source device transmits right channel audio information to a second sink device. Thus, the transmit control engine 235 may determine the appropriate MIMO scheme and provide this information to the source link exchange engine 225 for a packet to be transmitted.

The link stat processing engine 240 may receive link statistics associated with the primary sink device 110 and/or the secondary sink device 115. As will be described in detail below, link statistics associated with the primary sink device 110 and/or the secondary sink device 115 may be determined and provided to the source device 105. The link stat processing engine 240 may process the link statistics to identify, for example, a quality of the communication link for the primary sink device 110 and/or the secondary sink device 115. Based on this identification, the transmit control engine 235 may then be used to determine an appropriate transmission setting (e.g., transmit power, MIMO scheme, beam forming scheme, transmit antenna, etc.).

The bud link listening engine 245 may listen to exchanges occurring over the B2B link 125 to determine link statistics associated with the primary sink device 110 and/or the secondary sink device 115. The bud link listening engine 245 may process the link statistics to identify, for example, a quality of the communication link for the secondary sink device 115. Based on this identification, the bud link listening engine 245 may provide information to the transmit control engine 235 to determine an appropriate transmission setting (e.g., transmit power, MIMO scheme, beam forming scheme, transmit antenna, etc.).

Sink Device Engines

The following provides a brief description of the engines executed by the primary sink device 110 according to the exemplary embodiments. It should be understood that the secondary sink device 115 may also execute some or all of the same engines. The bud link exchange engine 265 may select settings and exchange data between the primary sink device 110 and the secondary sink device 115 over the B2B link 125 or the source device 105 over the S2B link 120. Those skilled in the art will understand the various manners that may be used to exchange data over the B2B link 125 and/or the s2B link 120.

The role switch engine 270 may identify the relationship to be used between the primary sink device 110 and the secondary sink device 115. After determining the link statistics of the primary sink device 110, the role switch engine 270 may also receive link statistics of the secondary sink device 115. Based on this information, the role switch engine 270 may determine which of the sink devices in the paired audio device 108 is to be set as the primary sink device 110 and the secondary sink device 115. Thereafter, the S2B link 120 with the source device 105 may be maintained with the same primary sink device 110 or updated with a new primary sink device 110 using any mechanism as those skilled in the art will understand. Throughout this description, when link statistics are used to compare channel conditions between the primary sink device 110 and the source device 105 (e.g., the S2B link 120) and the secondary sink device 115 and the source device (e.g., the eavesdrop link 130), it should be understood that any link statistic may be used for this comparison. In addition, when determining a relative quality of the links, a difference threshold of the link statistics may be used to identify a weaker or stronger link.

The relay engine 275 may determine a packet that was properly received by one of the primary sink device 110 or the secondary sink device 115 that is to be relayed to the other one of the primary sink device 110 or the secondary sink device 115. The relay engine 275 may utilize the bud link exchange engine 265 for the packet to be relayed over the B2B link 125. Thus, in the scenario where only one of the sink devices of the paired audio device 108 properly receives the packet, the relay engine 275 may be used to relay the packet to the sink device that did not receive the packet.

The power reduction engine 280 may dynamically adjust a transmit power used by the primary sink device 110 for transmissions to the source device 105. Using the bud link exchange engine 265, the power reduction engine 280 may receive link statistics from the secondary sink device 115. The power reduction engine 280 may compare the link statistics of the primary sink device 110 to the link statistics of the secondary sink device 115 to determine whether the eavesdrop 130 of the secondary sink device 115 is weaker than the S2B link 120 of the primary sink device 110 for receiving packets from the source device 105. In instances where the secondary sink device 115 has the weaker connection, the power reduction engine 280 may cause the primary sink device 110 to reduce transmit power when transmitting data to the source device 105 over the S2B link 120. A result of the transmit power reduction by the primary sink device 110 may be the source device 105 determining that the source device 105 transmit power should be increased. Thus, although the primary sink device 110 may not need the source device 105 to increase the transmit power, the increased transmit power may allow the secondary sink device 115 to increase the probability of receiving the packet from the source device 105.

The explicit feedback engine 285 may gather link statistic information for the primary sink device 110 and the secondary sink device 115 and generate a packet or packets including the link statistic information (hereinafter referred to as "link statistic packet") that is to be transmitted to the source device 105. The secondary sink device 115 may transmit the link statistics to the explicit feedback engine 285 of the primary sink device 110. The explicit feedback engine 285 may determine link statistics for the primary sink device 110. The explicit feedback engine 285 may generate the link statistic packet and transmit the link statistic packet to the source device 105 over the S2B link 120. Using this information, the source device 105 may select appropriate settings to transmit subsequent packets so increase the probability that both the primary sink device 110 and the secondary sink device 115 receive the packet.

The inexplicit feedback engine 290 may gather link statistic information of the primary sink device 110 and the secondary sink device 115 and incorporate the link statistic information in packets that are bound for the source device 105. In this example, there may not be an explicit packet designated for link statistics feedback. Rather, the link statistics may be included in available space in other packets, (e.g., control packets, data packets, etc.) that are sent to the source device 105 by the primary sink device 110. The source device 105 may use this data in a similar manner as described above for the explicit feedback data.

Sink Coordination Mechanisms

As discussed above, the sink coordination mechanisms are configured such that the sink devices perform operations that are transparent to the source device to increase a likelihood that the packet is received by each of the sink devices. A first exemplary sink coordination mechanism utilizes a role switch performed by the paired audio device 108. A second exemplary sink coordination mechanism utilizes a data relay between the primary sink device 110 and the secondary sink device 115. A third exemplary sink coordination mechanism utilizes a power reduction operation for packets bound for the source device 105. A fourth exemplary sink coordination mechanism utilizes a transmit coordination scheme for transmitting acknowledgements to the source device 105.

Figure 3:
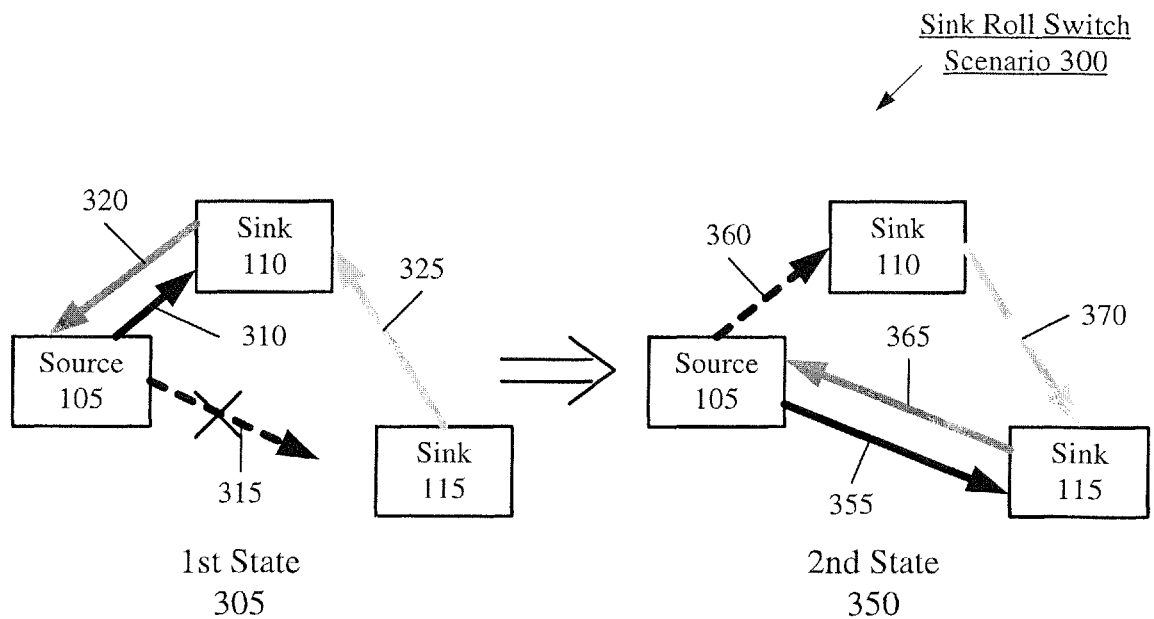
FIG. 3 shows a first exemplary scenario and corresponding mechanism for sink devices to receive a short-range transmission according to various exemplary embodiments described herein.

The first sink coordination mechanism utilizes a role switch performed by the paired audio device 108. FIG. 3 shows a sink roll switch scenario 300 and corresponding mechanism for the sink devices 110, 115 to receive a packet according to various exemplary embodiments described herein. FIG. 3 shows exemplary circumstances for which the first sink coordination mechanism may be used. As illustrated, the source device 105, the primary sink device 110, and the secondary sink device 115 of FIG. 1 are shown with various transmissions.

The sink roll switch scenario 300 shows a first state 305 that may trigger use of the first sink coordination mechanism. As illustrated, the source device 105 may establish the S2B link 120 with the sink device 110. In the first state 305, the sink device 110 may be the primary sink device while the sink device 115 may be the secondary sink device. Based on this relationship, the source device 105 may transmit a packet to the primary sink device 110 in a transmission 310. The secondary sink device 115 may use the eavesdrop 130 to attempt to receive the packet (illustrated as an eavesdrop 315). In this scenario, it may be considered that the primary sink device 110 may have a strong communication link with the source device 105 while the secondary sink device 115 may have a weak communication link with the source device 105. Thus, the primary sink device 110 may receive the packet while secondary sink device 115 may not receive the packet. The secondary sink device 115 may utilize the B2B link 125 to transmit a NACK in a transmission 325 to the primary sink device 110 to indicate the packet was not received. The primary sink device 110 may then use the S2B link 120 to transmit a NACK in a transmission 320 to the source device 105 to indicate that the packet was not successfully received by all sink devices.

In light of the conditions experienced in the first state 305, the primary sink device 110 and the secondary sink device 115 may utilize the first sink coordination mechanism that may include each of the primary sink device 110 and the secondary sink device 115 tracking link statistics for the communication link with the source device 105. The secondary sink device 115 may utilize the B2B link 125 to transmit the link statistics to the primary sink device 110. The secondary sink device 115 may transmit the link statistics at various times (e.g., continuously, periodically at predetermined intervals, when an event occurs, when a predetermined amount of change in the link statistics is registered, etc.). Based on the link statistics for the secondary sink device 115 and its own link statistics, the primary sink device 110 may determine which of the two sink devices 110, 115 that should be set as the primary for subsequent packet transmission from the source device 105. For example, the primary sink device 110 may designate the sink device having a weaker communication link to be the primary sink device. In one example, the sink device having a lower RSSI value for the communication link may be designated as primary. It should be understood that any link statistic may be used singularly or in combination with other link statistics to determine the weaker communication link. Thus, in the first state 305, the secondary sink device 115 may be identified as having the weaker communication link. Since the sink device having the weaker communication link is not currently set as the primary sink device, the primary sink device 110 and the secondary sink device 115 may perform a role switch operation over the B2B link 125 so that the sink device 110 becomes the secondary and the sink device 115 becomes the primary. Those skilled in the art will understand that to accomplish the role switch, the current S2B link 120 is disconnected and the sink device 115 (new primary) may establish a new S2B link 120 with the source device 105 while the sink device 110 (new secondary) uses the eavesdrop 130.

This may result in the second state 350 in which the source device 105 has the S2B link 120 with the new primary sink device 115 and the new secondary sink device 110 uses the eavesdrop 130. Assuming substantially similar conditions as the first state 305, in the second state 350, the source device 105 may use the RSSI from the new primary sink device 115 to select settings such that the packet is more likely to be received by the new primary sink device 115. For example, based on communications between the source device 105 and the new primary sink device 115, the source device 105 may determine a perceived RSSI for the new primary sink device 115. The source device 105 may then select to increase a transmit power so that the new primary sink device 115 is likely to receive the packet, leading to the second state 350. As illustrated in the second state 350, the source device 105 transmits a packet in a transmission 355 to the new primary sink device 115 over the S2B link 120. The new secondary sink device 110 uses the eavesdrop 130 (illustrated as an eavesdrop 360) and also receives the packet. Since the new secondary sink device 110 was already capable of receiving the packet based on settings used by the source device 105 in the first state 305, the new transmission settings will likely allow the new secondary sink device 110 to receive the packet. The new secondary sink device 110 may then transmit an ACK in a transmission 370 over the B2B link 125. The new primary sink device 115 may determine that both the new primary sink device 115 and the new secondary sink device 110 have received the packet such that an ACK is transmitted in a transmission 365 over the S2B link 120 to the source device 105.

By using the first sink coordination mechanism, the sink devices 110, 115 may passively or transparently cause the source device 105 to adjust transmission settings to make it more likely that both sink devices 110, 115 receive the transmitted packets. This approach may allow the source device 105 that has a larger capacity battery than the sink devices 110, 115 to utilize its power to allow the packet to be received by the sink devices 110, 115 rather than utilizing more power by the sink devices 110, 115 because of increased receiver sensitivity or increased relaying of packets using the B2B link 125.

Figure 4:
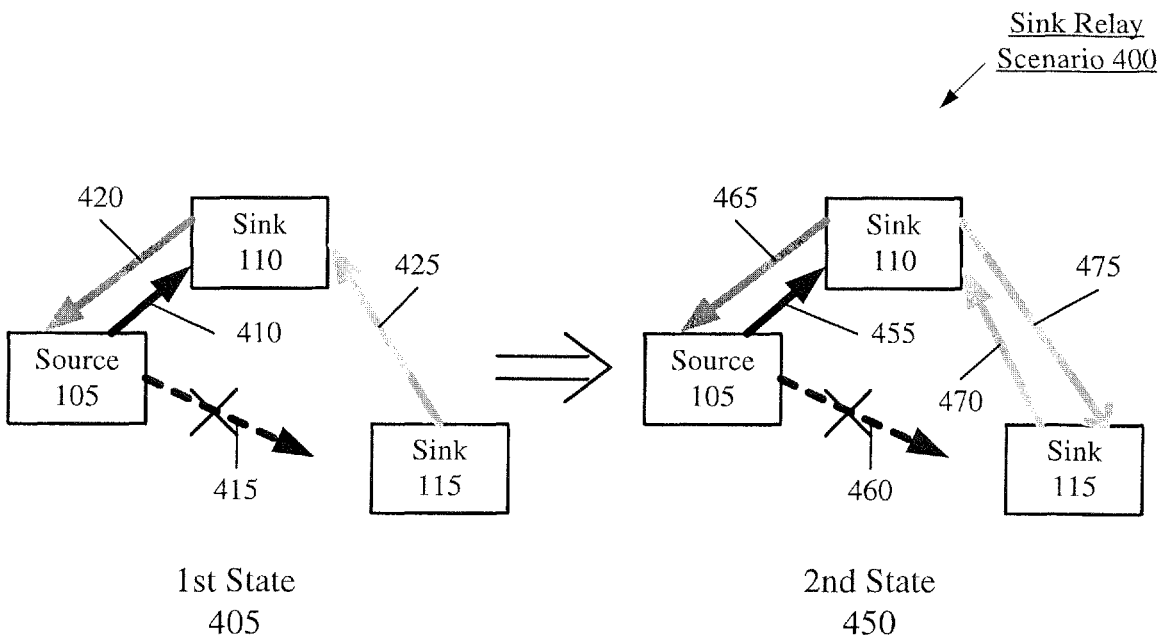
FIG. 4 shows a second exemplary scenario and corresponding mechanism for sink devices to receive a short-range transmission according to various exemplary embodiments described herein.

The second sink coordination mechanism utilizes a data relay between the primary sink device 110 and the secondary sink device 115. FIG. 4 shows a sink relay scenario 400 and corresponding mechanism for the sink devices 110, 115 to receive a packet according to various exemplary embodiments described herein. FIG. 4 shows exemplary circumstances for which the second sink coordination mechanism may be used. The sink relay scenario 400 shows a first state 405 that may trigger use of the second sink coordination mechanism. The first state 405 of the sink relay scenario 400 may be substantially similar to the first state 305 of the sink roll switch scenario 300. Thus, the communications 410-425 are similar to the communications 310-325 and will not be described further.

In light of the conditions experienced in the first state 405, the primary sink device 110 and the secondary sink device 115 may utilize the second sink coordination mechanism that includes using the B2B link 125 to relay the packet that was properly received by the primary sink device 110 to the secondary sink device 115. For example, using an available remaining time window allocated for transmitting a packet from the source device 105 to the primary sink device 110 (e.g., an initial transmission attempt or a retransmission attempt), the relay operation of the second sink coordination mechanism may be used. The second sink coordination mechanism may allow for further opportunities for the secondary sink device 115 to receive the packet.

The sink relay scenario 400 may then lead to the second state 450. The second state 450 may include substantially similar aspects as the first state 405. The source device 105 may transmit a packet to the primary sink device 110 in a transmission 455. The secondary sink device 115 may use the eavesdrop 130 (illustrated as an eavesdrop 460) to attempt to receive the packet but may be incapable of receiving the packet. However, in the second state 450, the primary sink device 110 and the secondary sink device 115 may use the relay operation of the second sink coordination mechanism. The packet that was received by the primary sink device 110 may be transmitted to the secondary sink device 115 in a transmission 475 using the B2B link 125. If the secondary sink device 115 successfully receives the packet, the secondary sink device will transmit an ACK to the primary sink device 110 in a transmission 470. If the secondary sink device in not successful in receiving the packet, the secondary sink device will transmit a NACK to the primary sink device 110 in the transmission 470. The primary sink device 110 may receive the transmission 470 and transmit an appropriate ACK or NACK in a transmission 46S to the source devoice 105.

The above exemplary embodiment and sink relay scenario 400 relates to the primary sink device 110 performing the relay operation of the second sink coordination mechanism based on the primary sink device 110 receiving the packet while the secondary sink device 115 does not receive the packet. However, this set of conditions for the sink relay scenario 400 is only exemplary. The relay operation of the second sink coordination mechanism may also be used in a reverse direction. For example, the secondary sink device 115 may receive the packet while the primary sink device 110 does not receive the packet. In such a condition, the relay operation of the second sink coordination mechanism may still be used and a transmission including the packet may be transmitted over the B2B link 125 from the secondary sink device 115 to the primary sink device 110.

By using the second sink coordination mechanism, the primary sink device 110 and the secondary sink device 115 may be capable of receiving the packet from the source device 105 with more opportunities using operations performed by the primary sink device 110 and the secondary sink device 115. By performing the second sink coordination mechanism using the primary sink device 110 and the secondary sink device 115, the mechanism may appear transparent to the source device 105. This approach may allow the source device 105 to retain more power in its battery to increase the battery life of the source device 105. Furthermore, increased opportunities to transmit the packet increases a probability that the packet is received by the primary sink device 110 and the secondary sink device 115 to reduce audio glitches.

The various mechanisms of the exemplary embodiments may be used in an individual manner but may also be used in combination. For example, the first sink coordination mechanism may be used with the second sink coordination mechanism. A factor that may determine whether one mechanism is to be used is a remaining battery life of the individual components. In a first exemplary set of conditions, the batteries of one or both of the sink devices 110, 115 may fall below a predetermined power level. In this situation, it may be more effective to use the source device 105 to transmit the packet with an increased probability of reception. Therefore, the role switch operation of the first sink coordination mechanism may be used that causes the source device 105 to, for example, increase the transmit power. In a second exemplary set of conditions, the sink devices 110, 115 may have a sufficient power level in their batteries while the battery level of the source device 105 may fall below a predetermined power level. In this situation, the it may be more effective to use the sink devices 110, 115 to provide further opportunities to transmit the packet using the relay operation of the second sink coordination.

Figure 5:
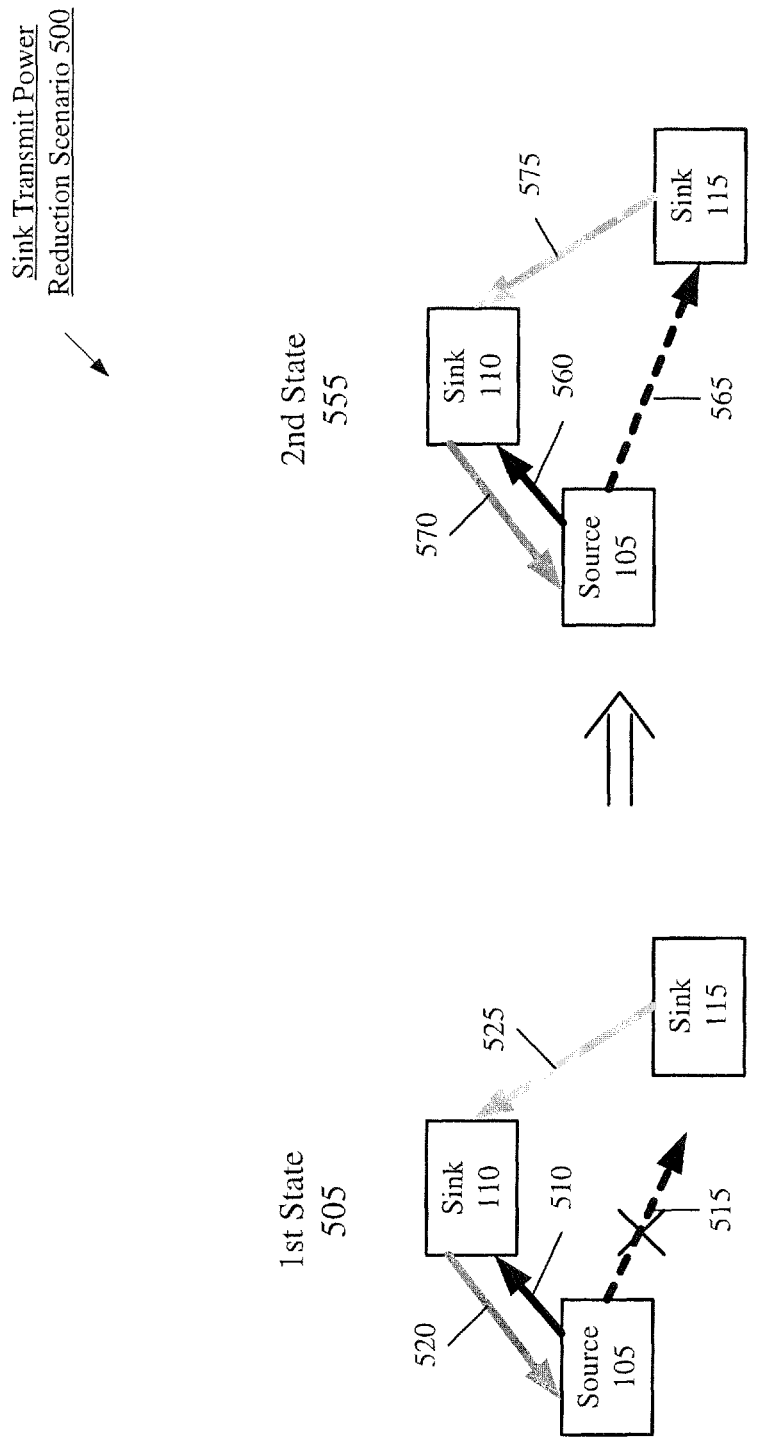
FIG. 5 shows a third exemplary scenario and corresponding mechanism for sink devices to receive a short-range transmission according to various exemplary embodiments described herein.

The third sink coordination mechanism utilizes a power reduction operation for packets bound for the source device 105, thereby causing the source device 105 to increase the transmit power. FIG. 5 shows a sink transmit power reduction scenario 500 and corresponding mechanism for the sink devices 110, 115 to receive a packet according to various exemplary embodiments described herein. FIG. 5 shows exemplary circumstances for which the third sink coordination mechanism may be used. The sink transmit power reduction scenario 500 shows a first state 505 that may trigger use of the third sink coordination mechanism. The first state 505 of the sink transmit power reduction scenario 500 may be substantially similar to the first state 305 of the sink roll switch scenario 300. Thus, the communications 510-525 are similar to the communications 310-325 and will not be described further.

In light of the conditions experienced in the first state 505, the primary sink device 110 and the secondary sink device 115 may utilize the power reduction operation of the third sink coordination mechanism. The primary sink device 110 may use various approaches to implement the power reduction operation. In a first approach, the third sink coordination mechanism may include each of the primary sink device 110 and the secondary sink device 115 tracking link statistics for the communication link with the source device 105 in a manner substantially similar to the first sink coordination mechanism. The secondary sink device 115 may utilize the B2B link 125 to transmit the link statistics of the secondary sink device 115 to the primary sink device 110. When the primary sink device 110 receives the link statistics of the secondary sink device 115, the primary sink device 110 may determine whether the communication link of the secondary sink device 115 is weaker than the communication link of the primary sink device 110. The weaker communication link may be causing the secondary sink device 115 to not receive the packet being transmitted over the S2B link 120. The primary sink device 110 may determine that the source device 105 should modify its settings used to transmit the packet so that the secondary sink device 115 may receive the packet. In a second approach, the third sink coordination mechanism may utilize the NACK in the transmission 525 to assume that the secondary sink device 115 has a weaker communication link. In a third approach, a combination of the link statistics and the indication may be used. Once the secondary sink device 115 is determined to have the weaker communication link, the primary sink device 110 may adjust its settings to transmit data to the source device 105 over the S2B link 120. For example, the primary sink device 110 may reduce the transmit power for the transmission 520 or subsequent transmissions. The reduction in the transmit power by the primary sink device 110 may result in the source device 105 not receiving the transmissions or the source device 105 receiving the transmissions at a lower power level (e.g., the source device 105 perceiving a lower average RSSI for the primary sink device 110). In either case, this will cause the source device 105 to increase the transmit power the source device 105 is using for transmissions.

The sink transmit power reduction scenario 500 may then lead to the second state 555. In the second state 555, the source device 105 may transmit a packet to the primary sink device 110 in a transmission 560 using updated settings (e.g., higher transmit power) in view of the result from the first state 505 (e.g., the lower transmit power of the primary sink device 110). The updated settings to transmit the packet may also result in the secondary sink device 115 using the eavesdrop 130 (illustrated as an eavesdrop 565) to receive the packet. An ACK may then be transmitted from the secondary sink device 115 to the primary sink device 110 in a transmission 575 over the B2B link 125. The primary sink device 110 may then transmit an ACK in a transmission 570 to the source device 105 indicating that both the primary sink device 110 and the secondary sink device 115 received the packet.

By using the third sink coordination mechanism, the primary sink device 110 and the secondary sink device 115 may be capable of transparently modifying the settings used by the source device 105 to transmit packets so that both the primary sink device 110 and the secondary sink device 115 have an increased probability of receiving the.

In the above examples, the sink coordination mechanisms were triggered by the secondary sink device 115 not receiving a transmitted packet. However, other triggers may be used to implement the sink coordination mechanisms. For example, even if a packet is received by the secondary sink device 115, the link statistics may trigger one or more of the sink coordination mechanisms.

Figure 6:
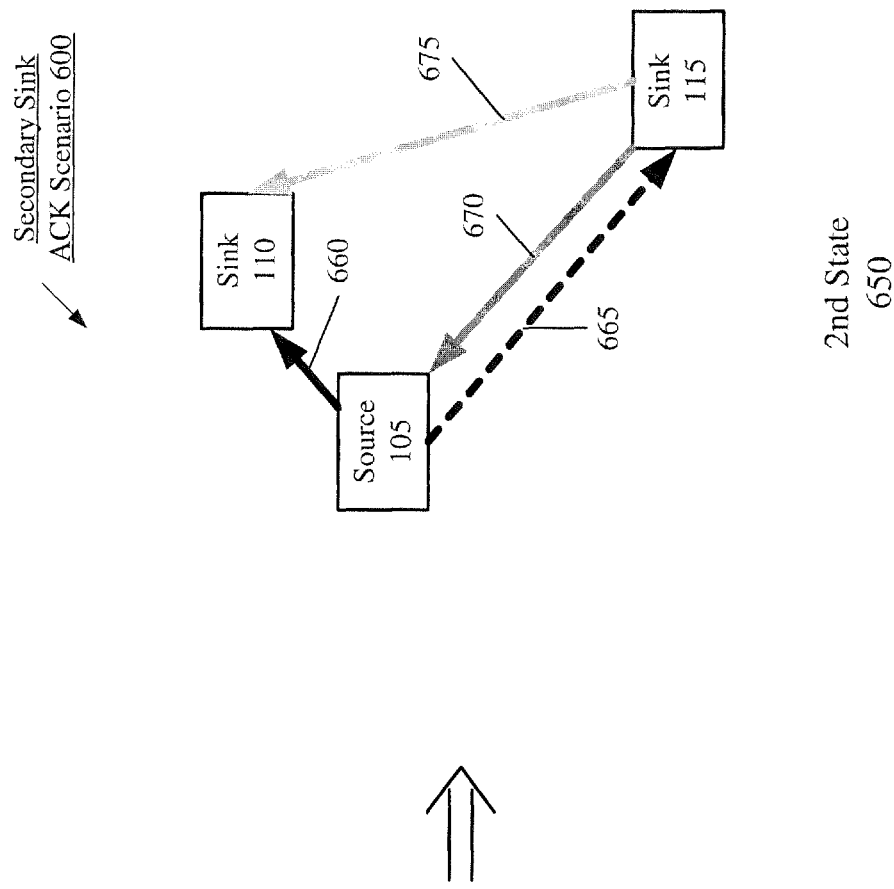
FIG. 6 shows a fourth exemplary scenario and corresponding mechanism for sink devices to receive a short-range transmission according to various exemplary embodiments described herein.
Figure 6:
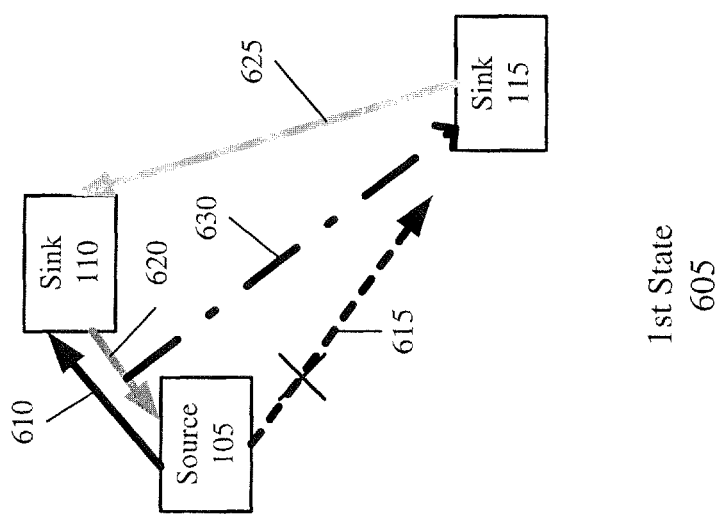

The fourth exemplary sink coordination mechanism utilizes a transmit coordination scheme for transmitting acknowledgements to the source device 105. FIG. 6 shows a secondary sink ACK scenario 600 and corresponding mechanism for the sink devices 110, 115 to receive a packet according to various exemplary embodiments described herein. FIG. 6 shows exemplary circumstances for which the fourth sink coordination mechanism may be used. As illustrated, the source device 105, the primary sink device 110, and the secondary sink device 115 of FIG. 1 are shown with various transmissions.

The secondary sink ACK scenario 600 shows a first state 605 that may trigger use of the fourth sink coordination mechanism. Similar to the above described scenarios, the sink device 110 may be the primary sink device while the sink device 115 may be the secondary sink device. The source device 105 may transmit a packet to the primary sink device 110 in a transmission 610. The secondary sink device 115 may use the eavesdrop 130 to attempt to receive the packet (illustrated as an eavesdrop 615). In this scenario, it may be considered that both the primary sink device 110 and the secondary sink device 115 successfully received the packet. The secondary sink device 115 may utilize the B2B link 125 to transmit an ACK in a transmission 625 to indicate the packet was successfully received. The primary sink device 110 may then use the S2B link 120 to transmit an ACK in a transmission 620 to the source device 105 to indicate the packet was successfully received by all sink devices.

Throughout this description, when it is stated that the source device 105 receives an ACK indicating that a packet was successfully received by all sink devices, this does not necessarily mean that the ACK includes an indication that identifies all the sink devices. Rather, because the source device 105 receives an ACK from the primary sink device 110, the source device 105 may assume that all of the secondary sink devices have successfully received the packet because, as stated above, the source device 105 may not even be aware of all the sink devices. Similarly, when the source device receives a NACK, it may not indicate the exact sink device that did not receive the packet, just that one of the sink devices did not receive the packet.

In this exemplary secondary sink ACK scenario 600, the source device 105 did not successfully receive the transmission 620 (including the ACK). There may be various reasons why the packet transmission 610 was successful but the ACK transmission 620 was not successful over the same communication link. For example, radio conditions may have changed, a temporary interferer may have appeared, the devices may have moved relative to each other, etc. In any case, under normal circumstances, when the source device 105 does not receive an ACK indicating the sink devices successfully received the packet, the source device 105 will attempt to retransmit the packet for as many times as needed (or as limited by retransmission attempts) in order to receive an ACK indicating the sink devices received the packet. However, this could lead to unnecessary increases in the transmit power by the source device 105 and to multiple retransmission attempts that are not needed because the sink devices actually received the packet.

To correct this issue, the fourth mechanism utilizes a transmit coordination scheme between the sink devices 110 and 115 for transmitting acknowledgements to the source device 105. In this example, the secondary sink device 115 uses another eavesdrop operation 630 to listen to the transmission 620 sent from the sink device 110 to the source device 105. Since the secondary sink device 115 knows that it received the packet successfully and that the primary sink device 110 sent an ACK to the source device 105, the secondary sink device 115 understands that both sink devices 110 and 115 successfully received the packet.

However, because the source device 105 did not receive the ACK transmission 620, the source device 105 will attempt a first retransmission attempt as shown in the second state 650. The source device 105 may retransmit the packet to the primary sink device 110 using a transmission 660, the secondary sink device 115 may use the eavesdrop 130 to attempt to receive the packet (illustrated as an eavesdrop 665). In this scenario, it may be considered that both the primary sink device 110 and the secondary sink device 115 successfully received the packet (either in the original transmission attempt or the retransmission attempt). The secondary sink device 115 may utilize the B2B link 125 to transmit an ACK in a transmission 675 to indicate the packet was successfully received. However, in this scenario, instead of the primary sink device 110 sending the ACK transmission to the source device 105, the secondary sink device 115 sends a transmission 670 including the ACK to the source device 105. In this manner, when the secondary sink device 115 may have a better communication path to the source device 105, the secondary sink device may transmit the ACK when the first transmission of the ACK by the primary sink device 110 fails. When the source device 105 receives the transmission 670 including the ACK, the source device will understand that the sink devices have received the packet and will discontinue any additional retransmissions.

It should be understood that there should be an agreement between the sink devices 110 and 115 that the secondary sink device 115 will transmit the ACK instead of the primary sink device 110. This agreement may be based on preprogramming where if the first ACK transmission 620 fails, the secondary sink device 115 will perform a second (or any subsequent) ACK transmission(s) 670. In another example, a communication between the sink devices 110 and 115 may be used to determine the sink device 110 or 115 that will send the ACK transmission 670. For example, this information may be exchanged in the transmission 675. It should also be understood that since the source device 105 may be unaware of the existence of the secondary sink device 115, when the secondary sink device 115 transmits the ACK transmission 670, the secondary sink device 115 may use information such as the address of the primary sink device 110 in the transmission so that the source device 105 identifies the transmission 670 to be coming from the primary sink device 110 (even though it is actually coming from the secondary sink device 115). Finally, it should also be understood that the primary sink device 110 may, at the same time, also send a transmission with the primary ACK in the normal manner, e.g., there may be two transmissions simultaneously from the primary sink device 110 and secondary sink device 115 that include the primary ACK.

The fourth exemplary sink coordination mechanism may also have alternative exemplary embodiments. In a first example of an alternative embodiment, the secondary sink device 115, in addition to sending the transmission 670 with the primary ACK in the designated transmission slot for the ACK, may also send a further transmission with a secondary ACK at the expected source slot boundary (e.g., near the boundary of the Bluetooth slot designated for transmission of the packet). This further transmission may be sent when, for example, the source device 105 has only one simultaneous receive antenna or cannot perform successive cancellation methods using more than one antenna. Another condition where this further transmission may be used is when the channel conditions between the secondary sink device 115 and the source device 105 are significantly better than the channel conditions between the primary sink device 110 and the source device 105 (e.g., greater than 20 dB). This embodiment may be applied on its own or in combination with the other conditions described above.

In another example, the further transmission may be sent when the source device 105 has two or more simultaneous receive chain receptions and can use successive cancellation methods to lock down on a strongest one of the signals (e.g., transmission 670 or the further transmission). In a still further example, the further transmission may be sent when the source device 105 supports maximum ratio combining (MRC) or rake receiving, where the receive power from two separate transmissions may be combined.

In a second example of an alternative embodiment of the fourth sink coordination mechanism, the secondary sink device 115, in addition to sending the transmission 670 with the primary ACK in the designated transmission slot, may also send a further transmission with a secondary ACK prior to the designated transmission slot for the transmission 670. This earlier transmission may aid the source device 105 to lock on the stronger signal that is coming from the secondary sink device 115. In this exemplary embodiment, the further transmission may be at a predetermined time that is prior to the designated transmission slot for the ACK and the source device 105 may open its reception window earlier to receive the further transmission. This early opening of the reception window by the source device 105 may be negotiated between the devices.

In a third example of an alternative embodiment of the fourth sink coordination mechanism, the secondary sink device 115, instead of sending the transmission 670 with the primary ACK in the designated transmission slot, may send the transmission 670 including the primary ACK after the designated transmission slot (e.g., in the interframe space (IFS) after the designated transmission slot such as at a half slot start boundary). As described above, the primary sink device 110 may also be transmitting the primary ACK in the designated transmission slot and each of these alternative exemplary embodiments of the fourth sink coordination mechanisms may aid the source device 105 in receiving the primary ACK that is sent by either the secondary sink device 115 or the primary sink device 110.

Sink-Source Coordination Mechanisms

The sink-source coordination mechanisms are configured such that the sink devices perform operations to provide information to the source device to modify the transmission settings that increase a likelihood that the packet is received by each of the sink devices. The exemplary embodiments may provide a plurality of sink-source coordination mechanisms. As will be described below, a first sink-source coordination mechanism utilizes an explicit protocol to provide link statistics of the primary sink device 110 and the secondary sink device 115 to the source device 105. A second sink-source coordination mechanism utilizes an inexplicit protocol to provide link statistics of the primary sink device 110 and the secondary sink device 115 to the source device 105.

Figure 7:
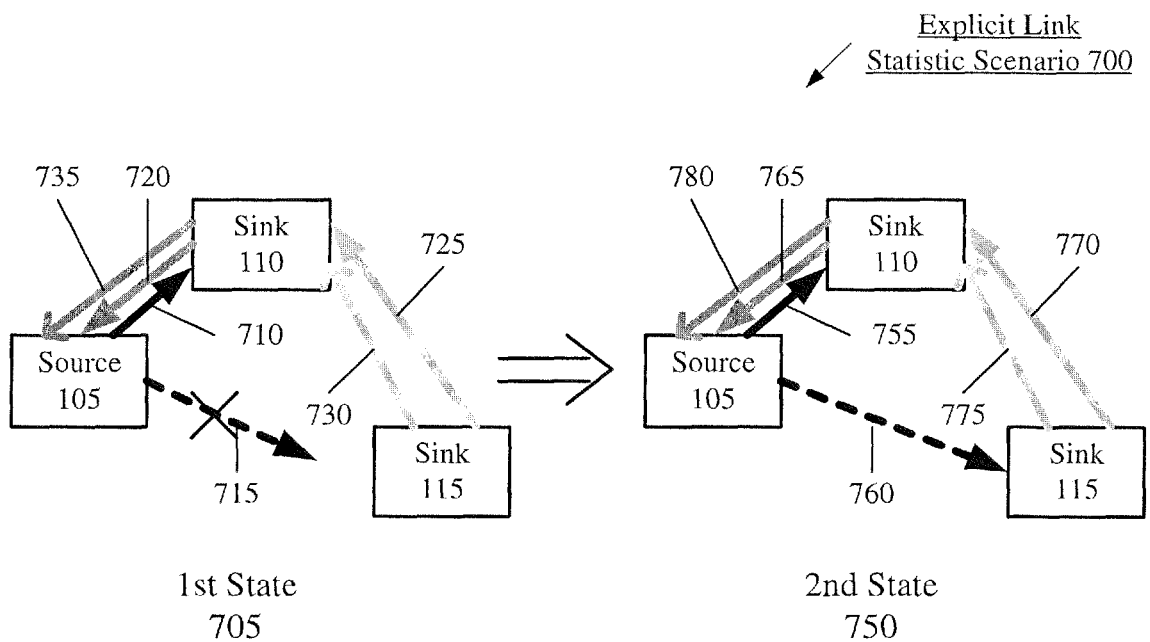
FIG. 7 shows a fifth exemplary scenario and corresponding mechanism for sink devices to receive a short-range transmission according to various exemplary embodiments described herein.

The first sink-source coordination mechanism utilizes an explicit protocol to provide link statistics of the primary sink device 110 and the secondary sink device 115 to the source device 105. FIG. 7 shows an explicit link statistic scenario 700 and corresponding mechanism for the sink devices 110, 115 to receive a packet according to various exemplary embodiments described herein. FIG. 7 shows exemplary circumstances for which the first sink-source coordination mechanism may be used. As illustrated, the source device 105, the primary sink device 110, and the secondary sink device 115 of FIG. 1 are shown with various transmissions.

The explicit link statistic scenario 700 shows a first state 705 that may trigger use of the first sink-source coordination mechanism. As illustrated, the source device 105 may establish the S2B link 120 with the primary sink device 110. The source device 105 may transmit a packet to the primary sink device 110 in a transmission 710. The secondary sink device 115 may use the eavesdrop 130 (illustrated as an eavesdrop 715) to receive the packet. Again, in this example, the primary sink device 110 may receive the packet and the secondary sink device 115 may not receive the packet. The secondary sink device 115 may utilize the B2B link 125 to transmit a NACK in a transmission 725 to indicate the packet was not received. The primary sink device 110 may receive the transmission 725 and may transmit a NACK to the source device 105 in a transmission 720 over the S2B link 120 indicating that all the sink devices 110, 115 have not received the packet.

In light of the conditions experienced in the first state 705, the primary sink device 110 and the secondary sink device 115 may use the first sink-source coordination mechanism.

The secondary sink device 115 may send a transmission 730 to the primary sink device 110 including link statistics associated with the eavesdrop 130 communication link being experienced by the secondary sink device 115. The transmission 730 may be a link statistic packet that is a dedicated packet used for sending the link statistics of the secondary sink device 115. For example, the link statistic packet may be a specifically designated packet that is generated and transmitted for the purpose of providing the link statistics. The transmission 730 may be encoded (e.g., source coding) to reduce a number of bits used to transmit the link statistic packet over the B2B link 125. The secondary sink device 115 may determine the link statistics, generate the link statistic packet, and/or transmit the link statistic packet at various times. For example, the secondary sink device 115 may perform one or more of these operations at predetermined time intervals, at random time intervals, when an event is registered (e.g., a change in the link statistics, failure to receive a packet, etc.), etc.

The primary sink device 110 may also determine link statistics for the communication link with the source device 105 (e.g., the S2B link 120). Thus, when the primary sink device 110 receives the transmission 730, the primary sink device 110 may generate a further link statistic packet including the link statistics of both the primary sink device 110 and the secondary sink device 115. The primary sink device 110 may transmit the further link statistic packet in a transmission 735 to the source device 105. Similar to the link statistic packet transmitted by the secondary sink device 115, the further link statistic packet may be a dedicated packet used for the link statistics of the primary sink device 110 and the secondary sink device 115. The link statistics may include specific values for channel parameters (e.g., RSSI, BLER, channel estimates, etc.) and may also include status information (e.g., previous packet was received/not received by sink).

Upon receiving the further link statistic packet, the source device 105 may process the link statistic information. Based on the respective link statistic information of the primary sink device 110 and the secondary sink device 115, the source device 105 may determine appropriate settings to be used in transmitting subsequent packets. Therefore, when the link statistics of the secondary sink device 115 indicate that the packet is incapable of being received (as is the case in the state 705), the source device 105 may, for example, increase a transmit power for subsequent packets, alter beam forming or MIMO settings, etc.

The explicit link statistic scenario 700 may then lead to the second state 750 where the source device 105 may have modified its settings based on the link statistics received in the transmission 735. The second state 750 may include substantially similar aspects as the first state 705. For example, the source device 105 may transmit a packet to the primary sink device 110 in a transmission 755. The secondary sink device 115 may use the eavesdrop 130 (illustrated as an eavesdrop 760) to receive the packet. Upon receiving the packet using the eavesdrop 130, the secondary sink device 115 may transmit an ACK in a transmission 770 using the B2B link 125. The primary sink device 110 may receive the transmission 770 and generate an ACK to be transmitted in a transmission 765 to indicate both the primary sink device 110 and the secondary sink device 115 received the packet. In addition, the link statistic information may continue to be provided in the dedicated link statistic packet. For example, the secondary sink device 115 may transmit the link statistic information in a link statistic packet via a transmission 775 to the primary sink device 110. Upon receiving the transmission 775, the primary sink device 110 may transmit the link statistic information of the primary sink device 110 and the secondary sink device 115 in a further link statistic packet via a transmission 780 to the source device 105. In this manner, the source device 105 may continue to modify its settings according to the current conditions being experienced by the primary sink device 110 and the secondary sink device 115.

As described above, upon receiving the link statistics, the source device 105 may alter transmission settings, e.g., via the transmit control engine 235. In a first example, the setting that may be altered is the transmit power of the source device 105.

In a second example, the transmit control engine 235 may alter the beam forming setting of the source device 105. For example, the source device 105 may have two or more radio cores. Based on the received link statistics, the source device 105 may alter the beam forming settings of the source device 105. For example, the beam forming setting may be initially set to beam form to/from both the primary sink device 110 and the secondary sink device 115. However, based on the link statistics, the beam forming setting may be altered to beam form to a specific one of the primary sink device 110 or the secondary sink device 115. To provide a specific example, if the link statistics as described above indicate that the secondary sink device 115 did not receive the packet, the transmit control engine 235 may alter the beam forming setting for the first retransmission such that the beamforming is directed at the secondary sink device 115 so that there is a greater chance the secondary sink device 115 receives the packet since the primary sink device 105 has already received the packet.

In a third example, the transmit control engine 235 may alter the MIMO settings of the source device 105. For example, the source device 105 may implement a spatial multiplexing scheme to/from one or both of the primary sink device 110 and/or the secondary sink device 115 based on the link statistics.

The above exemplary implementation for the first sink-source coordination mechanism addresses the explicit link statistic scenario 700 where the secondary sink device 115 does not receive the packet using the eavesdrop 130 and the source device 105 alters the transmission settings for subsequent packets. However, the first sink-source coordination mechanism may also be used as a general, dynamic determination for the settings used by the source device 105 that continuously controls the transmission settings by balancing various considerations. For example, there may be a priority to have both the primary sink device 110 and the secondary sink device 115 to receive the packet. Thus, power consumption may become an ancillary consideration and the transmit power may be increased. In another example, when both the primary sink device 110 and the secondary sink device 115 receive the packet, different considerations may take priority such as power conservation on the source device 105. Accordingly, the first sink-source coordination mechanism may also be used to adjust the settings of the source device 105 for subsequent packets by considering this factor. For example, the transmit power may be lowered if the current conditions allow for this modified setting. For example, a historical view may show that a previous number of packets was successfully received by both the primary sink device 110 and the secondary sink device 115 to indicate that the transmit power may be re-evaluated.

By using the first sink-source coordination mechanism, the primary sink device 110 and the secondary sink device 115 may be capable of providing information to the source device 105 so that the source device 105 may modify the settings used to transmit subsequent packets so that both the primary sink device 110 and the secondary sink device 115 have an increased probability of receiving the packet. By performing the first sink-source coordination mechanism, the mechanism may allow for explicitly provided link statistics and more types of link statistics to be provided to the source device 105.

The various mechanisms of the exemplary embodiments may be used in an individual manner but may also be used in combination. Accordingly, the first sink-source coordination mechanism may be used with the above described sink coordination mechanisms. In a first example, the first sink-source coordination mechanism may be used with the second sink coordination mechanism (e.g., the relaying mechanism) such that a packet received by the primary sink device 110 may be transmitted (e.g., in a transmission 475) to the secondary sink device 115. A factor that may determine whether this combination may be used is a remaining battery life of the source device 105. Thus, to conserve power on the battery of the source device 105, the second sink coordination mechanism may also be used with the first sink-source coordination mechanism. In this example, while the source device 105 is receiving the link statistics, the source device 105 may not increase the transmit power because of a low battery level, but rather the sink devices 110, 115 will use the relay mechanism. However, if the battery level of the source device 105 is above a threshold, the source device 105 may increase the transmit power alleviating the need for the sink devices 110, 115 to use the relaying mechanism.

In a second example, the first sink-source coordination mechanism (e.g., explicit link statistics) may be used with the third sink coordination mechanism such that the primary sink device 110 requests the source device 105 to increase the source transmit power by reducing a transmit power used by the primary sink device 110. These examples are not meant to be exhaustive, but are merely used to illustrate that the various sink-source coordination mechanisms and the sink coordination mechanisms may be used in various combinations, or by themselves, to accomplish the goals of increasing the likelihood of success of the sink devices receiving the transmissions with the least amount of energy expended by the devices.

Figure 8:
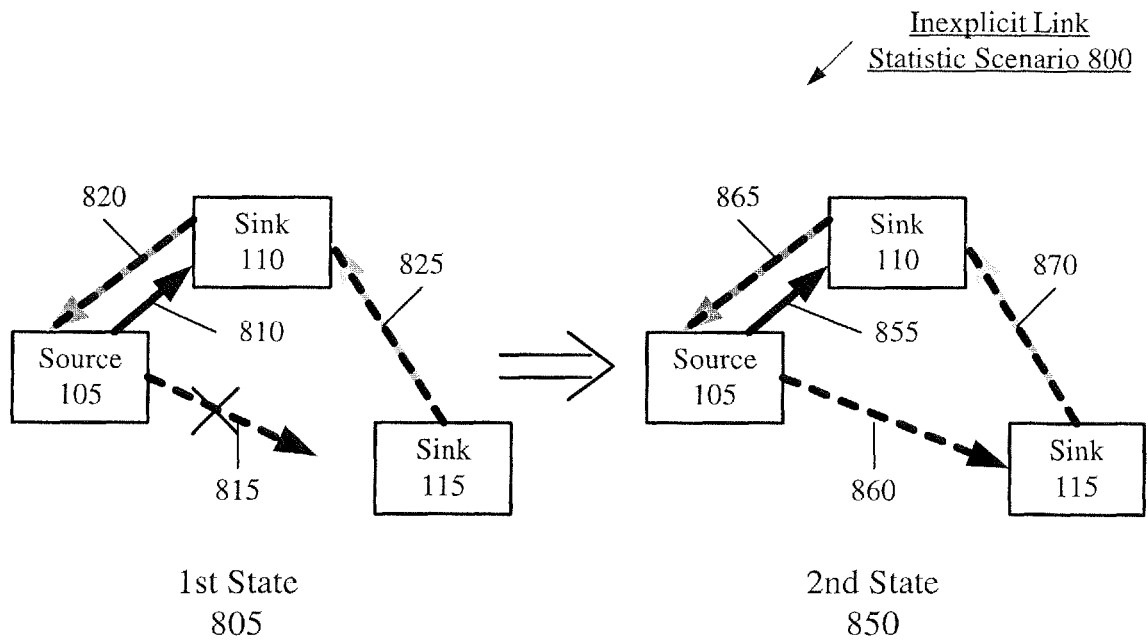
FIG. 8 shows a sixth exemplary scenario and corresponding mechanism for sink devices to receive a short-range transmission according to various exemplary embodiments described herein.

The second sink-source coordination mechanism utilizes an inexplicit protocol to provide link statistics of the primary sink device 110 and the secondary sink device 115 to the source device 105. FIG. 8 shows an inexplicit link statistic scenario 800 and corresponding mechanism for the sink devices 110, 115 to receive a packet according to various exemplary embodiments described herein. FIG. 8 shows exemplary circumstances for which the second sink-source coordination mechanism may be used. As illustrated, the source device 105, the primary sink device 110, and the secondary sink device 115 of FIG. 1 are shown with various transmissions.

The inexplicit link statistic scenario 800 shows a first state 805 that may trigger use of the second sink-source coordination mechanism. The inexplicit link statistic scenario 800 may be substantially similar to the explicit link statistic scenario 700. For example, the source device 105 may establish the S2B link 120 with the primary sink device 110 and a packet may be transmitted to the primary sink device 110 in a transmission 810. The secondary sink device 115 may use the eavesdrop 130 (illustrated as an eavesdrop 815) to attempt to receive the packet but may not receive the packet. The secondary sink device 115 may utilize the B2B link 125 to transmit a NACK in a transmission 825 to the primary sink device 110. The primary sink device 110 may receive the transmission 825 and generate a NACK to be transmitted to the source device 105 in a transmission 820 over the S2B link 120 to indicate that all of the sink devices 110, 115 did not receive the packet.

The second source-sink coordination mechanism may also provide link statistics of the primary sink device 110 and the secondary sink device 115 to the source device 105. However, rather than a link statistic packet that is dedicated for this purpose, the second source-sink coordination mechanism may extend a packet frame or repurpose designated bits in a packet that is normally transmitted over the B2B link 125 and/or the S2B link 120 to store the link statistics information. In using the second sink-source coordination mechanism, the secondary sink device 115 may utilize the B2B link 125 to incorporate the link statistic data in the transmission 825 (e.g., in a remaining portion of the transmission 825 that is empty) or any other transmission on the B2B link 125. Like the link statistic packet, the secondary sink device 115 may determine the link statistics, generate the link statistic data, and/or transmit the transmission 825 that includes the link statistic data at various times. However, the transmission 825 with the link statistic data may be transmitted at times when the transmission 825 would normally be transmitted (e.g., when an ACK or NACK indication is to be transmitted). The primary sink device 110 may also determine link statistics for the communication link with the source device 105 (e.g., the S2B link 120). Thus, when the primary sink device 110 receives the transmission 825, the primary sink device 110 may generate further link statistic data and include the link statistics of both the primary sink device 110 and the secondary sink device 115 in the transmission 820 or any other transmission over the S2B link 120.

Upon receiving the transmission 820, the source device 105 may unpackage the data and process the link statistic data to determine the link statistic information of the primary sink device 110 and the secondary sink device 115. The source device 105 may then perform substantially similar operations as performed by the source device 105 utilizing the first sink-source coordination mechanism, such as determining the appropriate settings to be used in transmitting subsequent packets. Therefore, when the link statistics of the secondary sink device 115 indicate that the packet is incapable of being received (as is the case in the state 805), the source device 105 may, for example, increase a transmit power for subsequent packets, alter the beam forming settings, alter the MIMO settings, etc.

The inexplicit link statistic scenario 800 may then lead to the second state 850. For example, the source device 105 may have modified its settings based on the link statistics received in the transmission 820. The second state 850 may include substantially similar aspects as the first state 805. For example, the source device 105 may transmit a packet to the primary sink device 110 using a transmission 855. The secondary sink device 115 may use the eavesdrop 130 (illustrated as an eavesdrop 860) to receive the packet. Upon receiving the packet using the eavesdrop 130, the secondary sink device 115 may transmit an ACK in a transmission 870 using the B2B link 125. The transmission 870 may also include the link statistics of the secondary sink device 115. The primary sink device 110 may receive the transmission 870 and generate an indication of an ACK to be transmitted as a transmission 865 that both the primary sink device 110 and the secondary sink device 115 received the packet. The transmission 865 may also include the link statistics of the primary sink device 110 and the secondary sink device 115. In this manner, the source device 105 may continuously modify its settings according to the current conditions being experienced by the primary sink device 110 and the secondary sink device 115.

By using the second sink-source coordination mechanism, the primary sink device 110 and the secondary sink device 115 may be capable of providing information to the source device 105 so that the source device 105 may modify the settings used to transmit subsequent packets so that both the primary sink device 110 and the secondary sink device 115 have an increased probability of receiving the packet. By performing the second sink-source coordination mechanism, the mechanism may allow for link statistics to be provided by an inexplicit protocol (e.g., embedded in transmissions meant to carry other types of data) to the source device 105. By providing the link statistic information, the source device 105 may utilize more advanced power control schemes through incorporation of various factors, may utilize beam forming to increase the likelihood that a packet is received by a particular sink device, may utilize MIMO to reduce the transmission and/or reception time, etc. Furthermore, since the second sink-source coordination mechanism uses packets that are bound to respective destinations (e.g., rather than a dedicated packet), the second sink-source coordination mechanism may also minimally increase air-time for transmissions with a short feedback latency.

Because the first sink-source coordination mechanism and the second sink-source coordination mechanism are substantially similar in approach where link statistic information of the primary sink device 110 and the secondary sink device 115 are provided to the source device 105, the second sink-source coordination mechanism may also be used and/or modified in a manner substantially similar to the first sink-source coordination mechanism. For example, the second sink-source coordination mechanism may be used as a general, dynamic determination for the settings used by the source device 105 that controls transmission settings by balancing various considerations. In another example, the second sink-source coordination mechanism may be used in combination with other mechanisms (e.g., the sink coordination mechanisms).

Source Smart-Listen Mechanism

Figure 9:
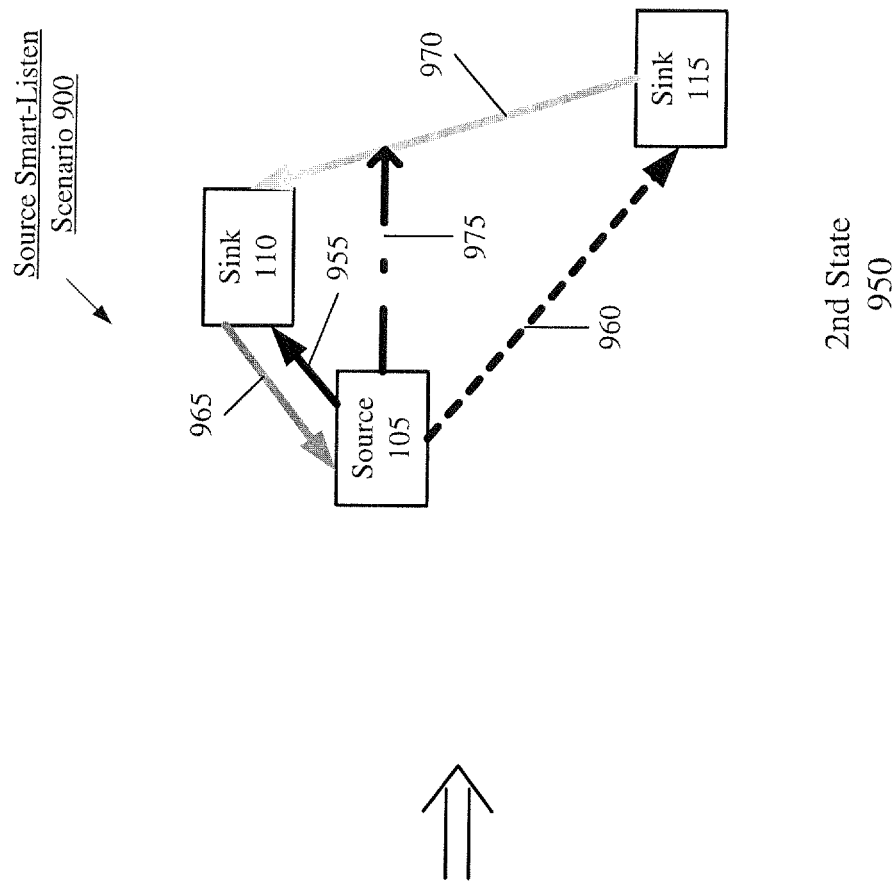
FIG. 9 shows a seventh exemplary scenario and corresponding mechanism for sink devices to receive a short-range transmission according to various exemplary embodiments described herein.
Figure 9:
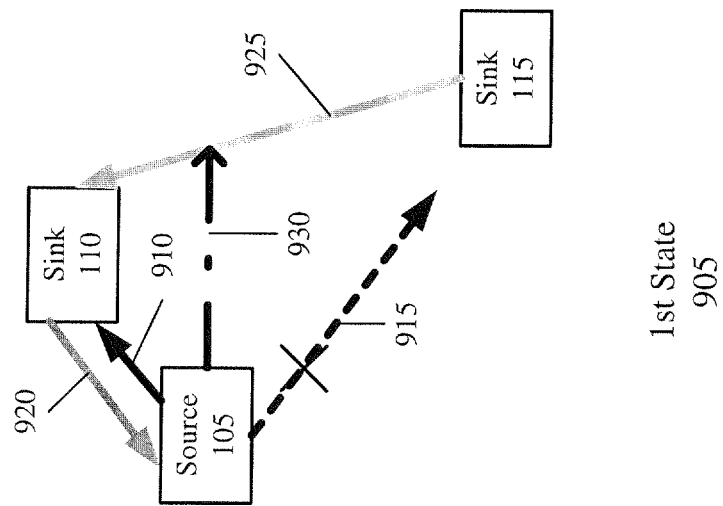

The source smart-listen mechanism is configured such that the source device 105 performs operations to ascertain information of the sink devices to modify the transmission settings that increase a likelihood that the packet is received by each of the sink devices. As will be described below, the source smart-listen mechanism utilizes a determining operation on the S2B link 120 to determine link statistics of the primary sink device 110 and a listening operation on the B2B link 125 to determine link statistics of the secondary sink device 115. FIG. 9 shows a source smart-listen scenario 900 and corresponding mechanism for the sink devices 110, 115 to receive a packet according to various exemplary embodiments described herein. FIG. 9 shows exemplary circumstances for which the source smart-listen coordination mechanism may be used. As illustrated, the source device 105, the primary sink device 110, and the secondary sink device 115 of FIG. 1 are shown with various transmissions.

The source smart-listen scenario 900 shows a first state 905 that may trigger use of the source smart-listen mechanism. As illustrated, the source device 105 may establish the S2B link 120 with the primary sink device 110. The source device 105 may transmit a packet to the primary sink device 110 in a transmission 910. The secondary sink device 115 may use the eavesdrop 130 (illustrated as an eavesdrop 915)

to attempt to receive the packet. Again, in this example, the primary sink device 110 may receive the packet and the secondary sink device 115 may not receive the packet. The secondary sink device 115 may utilize the B2B link 125 to transmit a NACK in a transmission 925 to indicate the packet was not received. The primary sink device 110 may receive the transmission 925 and generate a NACK to be transmitted to the source device 105 in a transmission 920 over the S2B link 120.

To address scenarios such as the source smart-listen scenario 900, the source device 105 may be configured to utilize a listening operation 930 to listen to the B2B link 125. The source device 105 may listen while the B2B link 125 is being used for transmissions, particularly while the secondary sink device 115 is transmitting data to the primary sink device 110. For example, the source device 105 may listen to the B2B link 125 while the secondary sink device 115 sends the indication 925. By listening to the B2B link 125, the source device 105 may determine link statistics of the secondary sink device 115. For example, the RSSI or channel estimates of the secondary sink device 115 relative to the source device 105 may be determined. The source device 105 may also determine further information of the secondary sink device 115. For example, the source device 105 may determine a transmit power (e.g., if a transmit power for a private ACK is different from a resting transmit scheme), a frequency hopping sequence of the secondary sink device 115 (e.g., if the secondary sink device 115 uses different transmit powers to the source device 105 and to primary sink device 110), different frequency hopping sequences (e.g., if the primary sink device 110 and the secondary sink device 115 uses different subnets than that of the source device 105 and the primary sink device 110), etc. The source device 105 may perform the listening operation 930 to determine the link statistics at various times. For example, the source device 105 may perform the listening operation 930 continuously, at predetermined time intervals that correspond to use of the B2B link 125, etc. In a particular implementation, after the source device 105 transmits a packet, during a remaining portion of a transmission window, the source device 105 may perform the listening operation 930 when the primary sink device 110 and the secondary sink device 115 are likely to use the B2B link 125 to, for example, exchange an indication as to whether the packet was received by the secondary sink device 115.

The source device 105 may also determine link statistics for the primary sink device 110 using the S2B link 120. For example, the link statistics (e.g., channel estimates, RSSI, etc.) of the primary sink device 110 may be determined based on the transmission 920 received from the primary sink device 110.

When the link statistics for both the primary sink device 110 and the secondary sink device 115 have been determined by the source device 105, the source device 105 may process the link statistic information to determine the appropriate settings to be used in transmitting subsequent packets. Therefore, when the link statistics of the secondary sink device 115 indicate that the packet is incapable of being received (as is the case in the state 905), the source device 105 may, for example, increase a transmit power for subsequent packets, change beam forming settings, change MIMO settings, etc.

The source smart-listen scenario 900 may then lead to the second state 950. For example, the source device 105 may have modified its settings based on the link statistics determined while in the first state 905. The second state 950 may include substantially similar aspects as the first state 905.

For example, the source device 105 may transmit a packet to the primary sink device 110 in a transmission 955. The secondary sink device 115 may use the eavesdrop 130 (illustrated as an eavesdrop 960) to receive the packet. Upon receiving the packet using the eavesdrop 130, the secondary sink device 115 may transmit an ACK in a transmission 970 using the B2B link 125. The primary sink device 110 may receive the transmission 970 and generate an ACK to be transmitted in a transmission 965 that both the primary sink device 110 and the secondary sink device 115 received the packet. In addition, the source device 105 may continue to perform a listening operation 975 on the B2B link 125. Accordingly, the source device 105 may continue to determine link statistics for the primary sink device 110 (e.g., via the transmission 965) and the secondary sink device 115 (e.g., via the transmission 870). In this manner, the source device 105 may dynamically modify its settings according to the current conditions being experienced by the primary sink device 110 and the secondary sink device 115.

The following provides an example of the source-smart listen mechanism when the source device 105 includes two radio cores and the determined statistics are used to change the beam forming and/or MIMO settings. The example is further described with respect to the source smart-listen scenario 900 of FIG. 9. In this example, the source device 105 sends the transmission 910 including the packet using initial settings for beam forming and/or MIMO using one or both radio cores of the source device. Again, the primary sink device 110 receives the transmission 910, but the secondary sink device 115 does not receive the transmission 910 via the eavesdropping operation 915. As described above, the exemplary mechanism may also be used when the secondary sink device 115 successfully receives the transmission 910 via the eavesdropping operation 915. The secondary sink device sends the transmission 925 including the NACK (or ACK if the packet was successfully received).

The source device 105 listens to the transmission 925 to determine the status of whether the secondary sink device 115 successfully received the packet and/or to determine channel estimates for the channel between the secondary sink device 115 and the source device 105. These channel estimates may be determined for both radio cores of the source device 105. The primary sink device 110 sends the transmission 920 including the NACK (or ACK if packet was successfully received by both sinks) to the source device 105. The source device 105 may also determine channel estimates for the channel between the primary sink device 110 and the source device 105 based on the transmission 920. These channel estimates may also be determined for both radio cores of the source device 105. The source device 105 may continue to update the channel estimates in frequency hopping systems as the devices use different frequencies to communicate.

In one example, a channel coefficient matrix may be developed for the multiple radio cores and different connections (e.g., core 0 and core 1 of the source device and source to primary sink device connection and source to secondary sink connection). Those skilled in the art will understand the generation of channel coefficient matrices. The matrix may be continuously updated (e.g., over various frequencies, including using interpolation and extrapolation). These link statistics may then be used for selecting beam forming settings and/or MIMO settings as described above.

The above exemplary implementation for the source smart-listen mechanism is to address the source smart-listen scenario 900 where the secondary sink device 115 does not receive the packet using the eavesdrop 130 and the source device 105 increasing the transmit power for subsequent packets. However, the source smart-listen mechanism may also be used as a general, dynamic determination for the settings used by the source device 105 that optimizes the source device 105 by balancing various considerations. For example, there may be a priority to have both the primary sink device 110 and the secondary sink device 115 to receive the packet. Thus, power consumption may become an ancillary consideration and the transmit power may be increased. In another example, when both the primary sink device 110 and the secondary sink device 115 receive the packet, different considerations may take priority such as power conservation on the source device 105.

Accordingly, the source smart-listen mechanism may also be used to adjust the settings of the source device 105 for subsequent packets by considering this factor. For example, the transmit power may be lowered if the current conditions allow for this modified setting. For example, a historical view may show that a previous number of packets was successfully received by both the primary sink device 110 and the secondary sink device 115 to indicate that the transmit power may be re-evaluated.

By using the source smart-listen mechanism, the source device 105 may be capable of determining link statistic information of the primary sink device 110 and the secondary sink device 115 so that the source device 105 may modify the settings used to transmit subsequent packets so that both the primary sink device 110 and the secondary sink device 115 receive the packet with an increased probability. By performing the source smart-listen mechanism, the primary sink device 110 and the secondary sink device 115 may continue operating without modification or increased operations (e.g., that result in increased power consumption). Furthermore, the source smart-listen mechanism may provide for no further air-time used in transmissions with a short feedback latency.

The various mechanisms of the exemplary embodiments may be used in an individual manner but may also be used in combination. Select exemplary combinations of the mechanisms are described above. However, those skilled in the art will appreciate that different combinations of the mechanisms may be used to provide, for example, a fallback position, a redundancy operation, etc. that increases the probability that the primary sink device 110 and the secondary sink device 115 receives the packet successfully.

The exemplary embodiments provide a device, system, and method for providing mechanisms that increase a probability that a plurality of sink devices properly receive a packet transmitted by a source device. The exemplary embodiments may provide a plurality of sink coordination mechanisms, a plurality of sink-source coordination mechanisms, and a source smart-listen mechanism. In a first sink coordination mechanism, the sink devices may be configured to dynamically determine a relationship to be used between one another and with the source device by selecting which of the sink devices is the primary while the remaining ones are secondary. In a second sink coordination mechanism, the sink devices may be configured to utilize a relay operation for a packet that is received by one of the sink devices to be relayed to another one of the sink devices that did not receive the packet. In a third sink coordination mechanism, the primary sink device may utilize link statistics of the secondary sink devices to reduce a transmit power that results in a transmit power of the source device to be increased. In a first sink-source coordination mechanism, the sink devices may gather link statistics of themselves and provide the link statistics to the source device explicitly in a dedicated packet so that the source device may modify settings used in transmitting packets. In a second sink-source coordination mechanism, the sink devices may gather link statistics of themselves and provide the link statistics to the source device inexplicitly in packets that are used for different purposes so that the source device may modify settings used in transmitting packets. In the source smart-listen mechanism, the source device may determine link statistics of the sink devices based on transmissions directly from the sink devices or transmissions between the sink devices so that the source device may modify settings used in transmitting packets.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or scope of the disclosure. Thus, it is intended that the present disclosure cover the modifications and variations of this disclosure provided they come within the scope of the appended claims and their equivalents.

What is claimed is:

1. A method, comprising:
   at a first sink device connected to a second sink device via a first communication link and configured to eavesdrop on a second communication link between the second sink device and a source device:
   receiving, via eavesdropping on the second communication link, a packet transmitted by the source device;
   sending a first acknowledgement to the second sink device indicating the first sink device successfully received the packet;
   determining, via eavesdropping on the second communication link, the second sink device transmitted a second acknowledgement to the source device indicating the second sink device successfully received the packet;
   receiving, via eavesdropping on the second communication link, a retransmission of the packet transmitted by the source device; and
   sending a third acknowledgement to the source device indicating the second sink device successfully received the packet.

2. The method of claim 1, further comprising:
   sending a fourth acknowledgement to the second sink device indicating the first sink device successfully received the retransmission of the packet.

3. The method of claim 2, wherein the fourth acknowledgement comprises an indication that the first sink device will be sending the third acknowledgement to the source device.

4. The method of claim 1, wherein the third acknowledgement comprises an identification of the second sink device.

5. The method of claim 1, further comprising:
sending a fourth acknowledgement to the source device indicating the second sink device successfully received the packet.

6. The method of claim 5, wherein the fourth acknowledgement is sent after the third acknowledgement and prior to the source device sending a second retransmission of the packet.

7. The method of claim 5, wherein the fourth acknowledgement is sent prior to the third acknowledgement.

8. A method, comprising:
at a first sink device connected to a source device via a first communication link and connected to a second sink device via a second communication link:
determining first link statistics associated with the first communication link, wherein the first link statistics indicate a quality of a received signal by the first sink device from the source device on the first communication link;
receiving, from the second sink device, second link statistics associated with the second sink device eavesdropping on the first communication link, wherein the second link statistics indicate a quality of a received signal by the second sink device eavesdropping on the first communication link; and
sending, to the source device via the first communication link, the first link statistics and the second link statistics.

9. The method of claim 8, wherein the first link statistics and the second link statistics are sent to the source device in a dedicated packet.

10. The method of claim 8, wherein the first link statistics and the second link statistics are sent in a portion of a sink packet.

11. The method of claim 10, wherein the sink packet comprises an indication of whether the primary sink device and the secondary sink device received a packet transmitted by the source device.

12. The method of claim 10, wherein the sink packet comprises one of an extended frame, one or more repurposed designated bits, or a combination thereof to include the first link statistics and the second link statistics.

13. The method of claim 8, wherein the first link statistics comprise a received signal strength indicator (RSSI), a block error rate (BLER), or channel estimates.

14. The method of claim 8, wherein the second link statistics are received at predetermined time intervals, at random time intervals, or when an event is registered.

15. The method of claim 8, further comprising:
receiving, via the first communication link, a packet transmitted by the source device; and
determining the second sink device did not receive the packet transmitted by the source device, wherein the sending of the first link statistics and the second link statistics to the source device is based on determining the second sink device did not receive the packet.

16. The method of claim 15, wherein the determining the second sink device did not receive the packet is based on receiving a negative acknowledgement from the second sink device.

17. A method, comprising:
at a first sink device connected to a source device via a first communication link and connected to a second sink device via a second communication link:
receiving, via the first communication link, a packet transmitted by the source device;
receiving, via the second communication link, a first acknowledgement indicating the second sink device successfully received the packet;
sending, via the first communication link, a second acknowledgement to the source device indicating the first sink device successfully received the packet;
receiving, via the first communication link, a retransmission of the packet transmitted by the source device; and
receiving, via the second communication link, a third acknowledgement indicating the second sink device successfully received the retransmission of the packet, wherein the third acknowledgement comprises an indication that the second sink device will be sending a fourth acknowledgement to the source device indicating the first sink device successfully received the retransmission of the packet.

18. The method of claim 17, wherein the first sink device does not send a further acknowledgement related to the retransmission of the packet based on the indication that the second sink device will be sending a fourth acknowledgement to the source device indicating the first sink device successfully received the retransmission of the packet.

19. The method of claim 17, further comprising:
sending, via the first communication link, a fifth acknowledgement to the source device indicating the first sink device successfully received the retransmission of the packet.

20. The method of claim 19, wherein the fourth acknowledgement and the fifth acknowledgement are sent simultaneously to the source device.

* * * * *